US009248653B2

(12) United States Patent
Yoda et al.

(10) Patent No.: US 9,248,653 B2
(45) Date of Patent: Feb. 2, 2016

(54) IMAGE FORMING SYSTEM

(71) Applicant: SEIKO EPSON CORPORATION, Tokyo (JP)

(72) Inventors: Hiroyuki Yoda, Shiojiri (JP); Toru Nakazawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/199,827

(22) Filed: Mar. 6, 2014

(65) Prior Publication Data

US 2014/0253643 A1 Sep. 11, 2014

(30) Foreign Application Priority Data

Mar. 7, 2013 (JP) ................................ 2013-046035

(51) Int. Cl.

| | |
|---|---|
| ***H04N 1/034*** | (2006.01) |
| ***G06K 15/22*** | (2006.01) |
| ***B41J 2/175*** | (2006.01) |
| ***B41J 29/02*** | (2006.01) |

(52) U.S. Cl.

CPC .............. *B41J 2/175* (2013.01); *B41J 2/17509* (2013.01); *B41J 2/17523* (2013.01); *B41J 29/02* (2013.01); *B41J 2002/17516* (2013.01)

(58) Field of Classification Search

USPC ......... 347/3, 85, 108, 138, 214; 358/1.3, 296, 358/400, 401, 474, 500–503; 3/3, 85, 108, 3/138, 214

See application file for complete search history.

(56) References Cited

U.S. PATENT DOCUMENTS

| | | | | |
|---|---|---|---|---|
| 5,369,429 | A * | 11/1994 | Erickson | 347/7 |
| 5,909,226 | A * | 6/1999 | Takeda | 347/3 |
| 6,353,899 | B1 * | 3/2002 | Martin et al. | 714/57 |
| 7,706,701 | B2 * | 4/2010 | Wakide | 399/12 |
| 7,789,487 | B2 * | 9/2010 | Kawamura | 347/49 |
| 7,891,657 | B2 * | 2/2011 | Fujita | 271/121 |
| 8,085,432 | B2 * | 12/2011 | Hattori et al. | 358/1.3 |

FOREIGN PATENT DOCUMENTS

JP 2005-191929 7/2005

* cited by examiner

*Primary Examiner* — Anh T. N. Vo
(74) *Attorney, Agent, or Firm* — Workman Nydegger

(57) ABSTRACT

Provided is an image forming system including a case that accommodates an ink accommodating body which accommodates ink, a connection tube through which ink within the ink accommodating body can be supplied, and an image forming apparatus that has an ink jet printer that can eject the ink supplied through the connection tube and a reading apparatus which a reading surface on which an original copy G that is arranged on the ink jet printer is read. Then, the case is arranged beside the image forming apparatus in such a manner that an upper surface of the case is matched with the reading surface in terms of height.

15 Claims, 25 Drawing Sheets

IMAGE FORMING SYSTEM

BACKGROUND

1. Technical Field

The present invention relates to an image forming system.

2. Related Art

In the related art, an image forming apparatus has been known that includes a reading unit that reads an original copy (a medium), and a recording unit that records on a sheet of paper an image that is read in the reading unit (for example, refer to JP-A-2005-191929). In the image forming apparatus, the corresponding original copy normally is read by the reading unit in a state where the original copy is placed on the reading surface.

Incidentally, in the image forming apparatus described above, because the original copy protrudes from the reading surface in a case where the original copy is larger in size than the reading surface is read, there is a problem in that the part of the original copy, which protrudes from the reading surface, cannot be supported at all.

SUMMARY

An advantage of some aspects of the invention is to provide an image forming system that is capable of supporting one portion of a medium protruding from a reading surface using a liquid-accommodating-body accommodating receptacle in a case of reading the corresponding medium larger in size than the reading surface.

According to an aspect of the present invention, there is provided an image forming system including: a liquid-accommodating-body accommodating receptacle that accommodates a liquid accommodating body that accommodates liquid; a tube through which the liquid in the liquid accommodating body can be supplied; and an image forming apparatus that has a liquid ejecting apparatus that is capable of ejecting the liquid supplied through the tube and a reading apparatus which has a reading surface on which a medium that is arranged on the liquid ejecting apparatus is read, in which an upper surface of the liquid-accommodating-body accommodating receptacle is arranged beside the reading apparatus so as to be matched with the reading surface in terms of height.

With this configuration, in a case where the medium is read that is larger in size than the reading surface of the reading apparatus, one portion of the corresponding medium can be supported by the liquid-accommodating-body accommodating receptacle.

Moreover, throughout the present specification, the expression "matched in terms of height" is defined as including not only the same height, but also a height difference of 2 cm or less.

According to another aspect of the present invention, there is provided an image forming system including: a liquid-accommodating-body accommodating receptacle that accommodates a liquid accommodating body that accommodates liquid; a tube through which the liquid in the liquid accommodating body can be supplied; an image forming apparatus that has a liquid ejecting apparatus that is capable of ejecting the liquid supplied through the tube and a reading apparatus that has a reading surface on which a medium that is arranged on the liquid ejecting apparatus is read, in which an upper surface of the liquid-accommodating-body accommodating receptacle is arranged beside the reading apparatus so as to be matched with the reading surface in terms of height.

With this configuration, in a case where the medium is read that is larger in size than the reading surface of the reading apparatus, one portion of the corresponding medium can be supported by the liquid-accommodating-body accommodating receptacle.

Moreover, throughout the present specification, the expression "matched in terms of height" is defined as including not only the same height, but also a height difference of 2 cm or less.

In the image forming system, the liquid ejecting apparatus may further include an extension portion that extends in such a manner that the extension portion can support the liquid-accommodating-body accommodating receptacle.

With this configuration, the liquid-accommodation-body accommodating receptacle can be supported by the extension portion.

In the image forming system, an upper surface of the liquid-accommodating-body accommodating receptacle may be lower in height than the reading surface.

With this configuration, when the medium larger in size than the reading surface of the reading apparatus is placed on the corresponding reading surface, the corresponding medium getting stuck in the liquid-accommodating-body accommodating receptacle can be suppressed.

In the image forming system, the liquid-accommodating-body accommodating receptacle may be attached with respect to the image forming apparatus in a freely attachable and detachable manner.

With this configuration, the liquid-accommodation-body accommodating receptacle can be freely attached and detached with respect to the image forming apparatus.

The image forming system may further include an adjusting member that, if a height of the image forming apparatus is changed, adjusts a height of the liquid-accommodating-body accommodating receptacle in accordance with the change in the height of the image forming apparatus.

With this configuration, the height of the liquid-accommodation-body accommodating receptacle can be adjusted in accordance with the height of the image forming apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
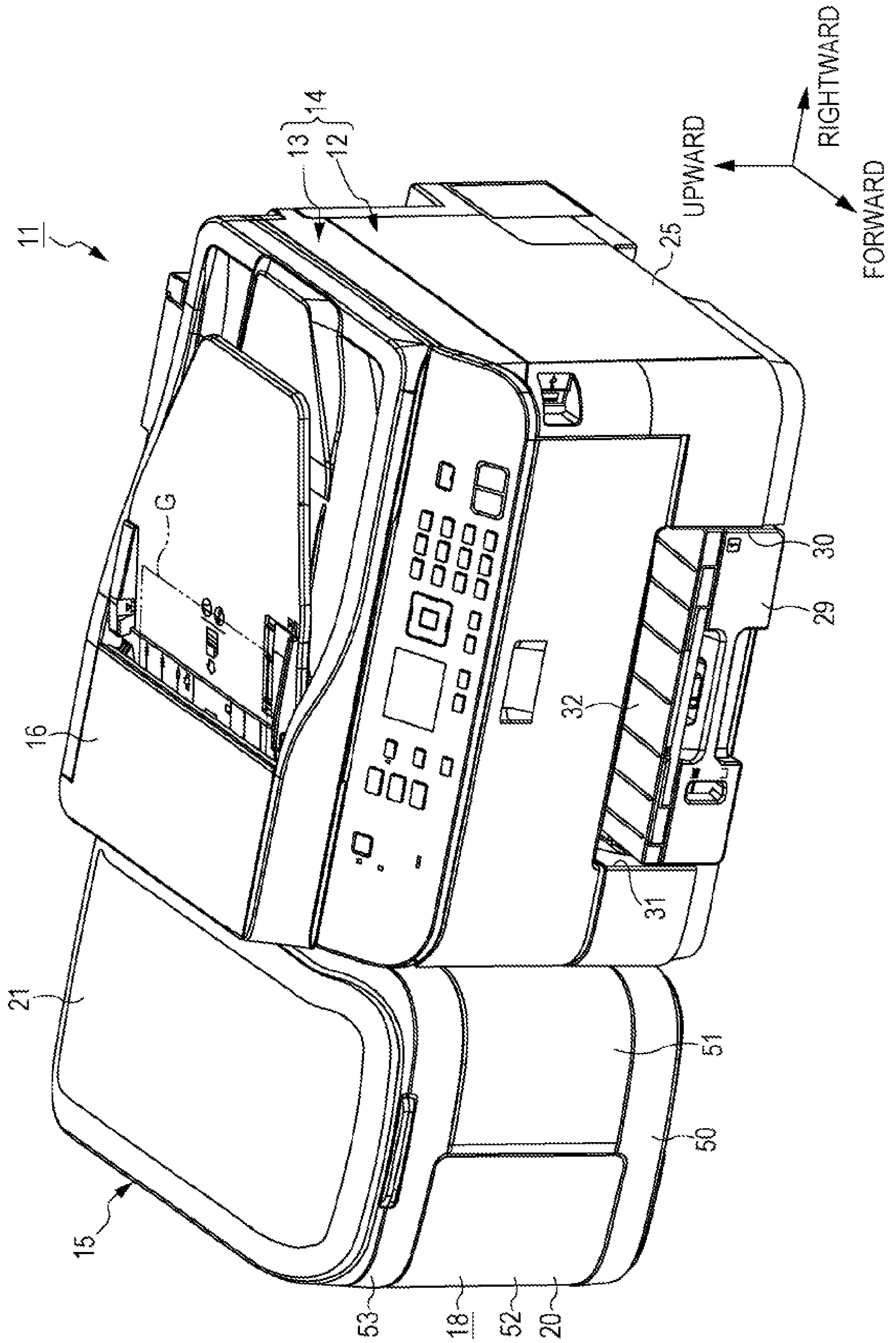
FIG. 1 is a perspective view of an image forming system according to one embodiment.

An image forming system according to one embodiment is described below referring to the drawings.

Figure 2:
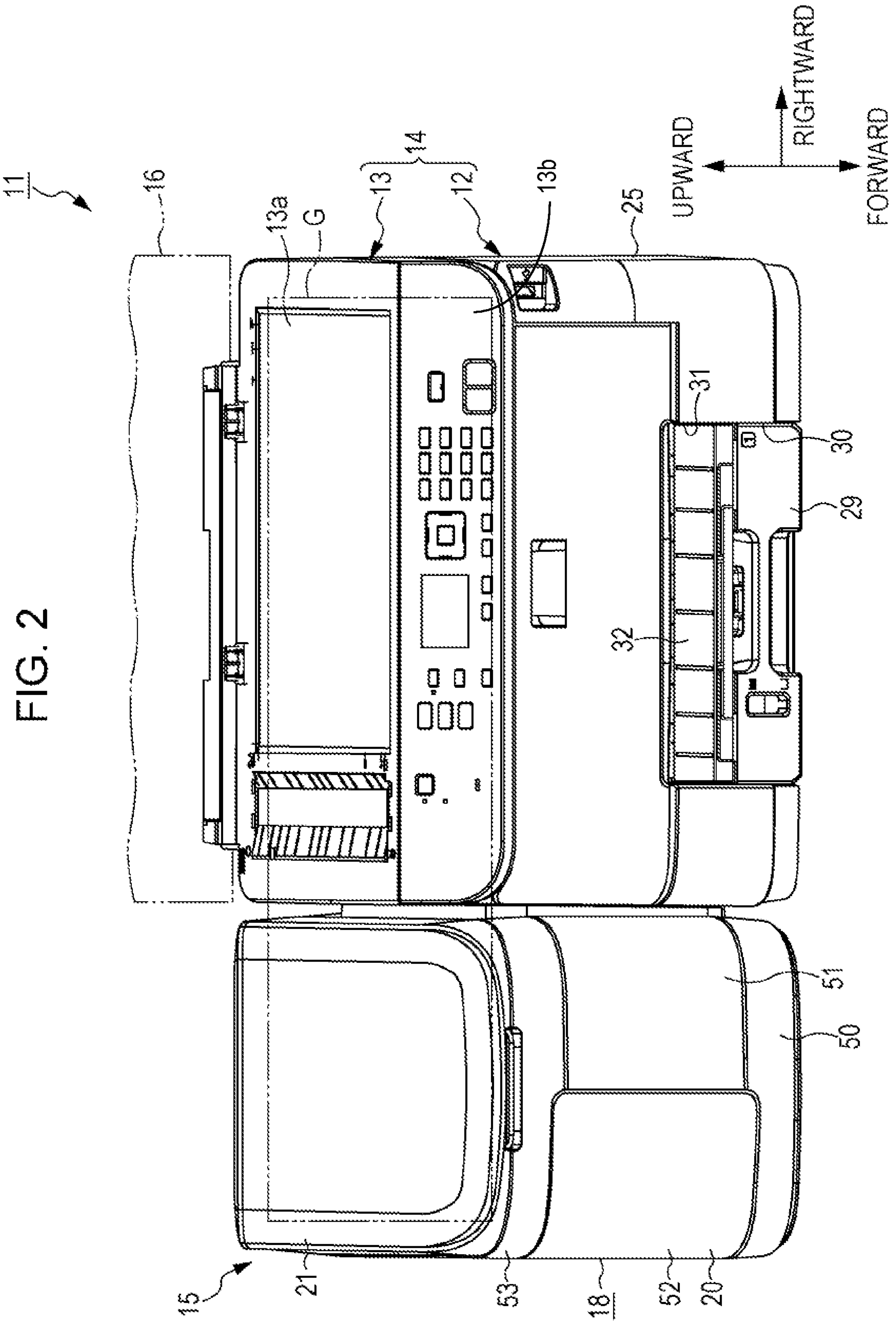
FIG. 2 is a perspective view illustrating a state of the image forming system that results when an auto document feeder is opened.

As illustrated in FIG. 1 and FIG. 2, an image forming system 11 includes an image forming apparatus 14 and an ink supply apparatus 15 as one example of a liquid supply apparatus that supplies ink to an ink jet printer 12. The image forming apparatus 14 has an ink jet printer 12 as one example of a liquid ejecting apparatus that ejects ink (liquid) and a reading apparatus 13 that reads an original copy G (a medium). The reading apparatus 13 is arranged on the ink jet printer 12.

The reading apparatus 13 has a reading surface 13 *a*, on which the original copy G is read, on top of it, and an operation panel 13*b* that is operated to read to the original copy G. An auto document feeder 16 is arranged on the reading apparatus 13 in such a manner that the reading surface 13 *a* can be opened and closed. The auto document feeder 16 sequentially supplies the multiple original copies G, stacked on top of one another, onto the reading surface 13 *a*, turning upside down one sheet by one sheet.

Figure 3:
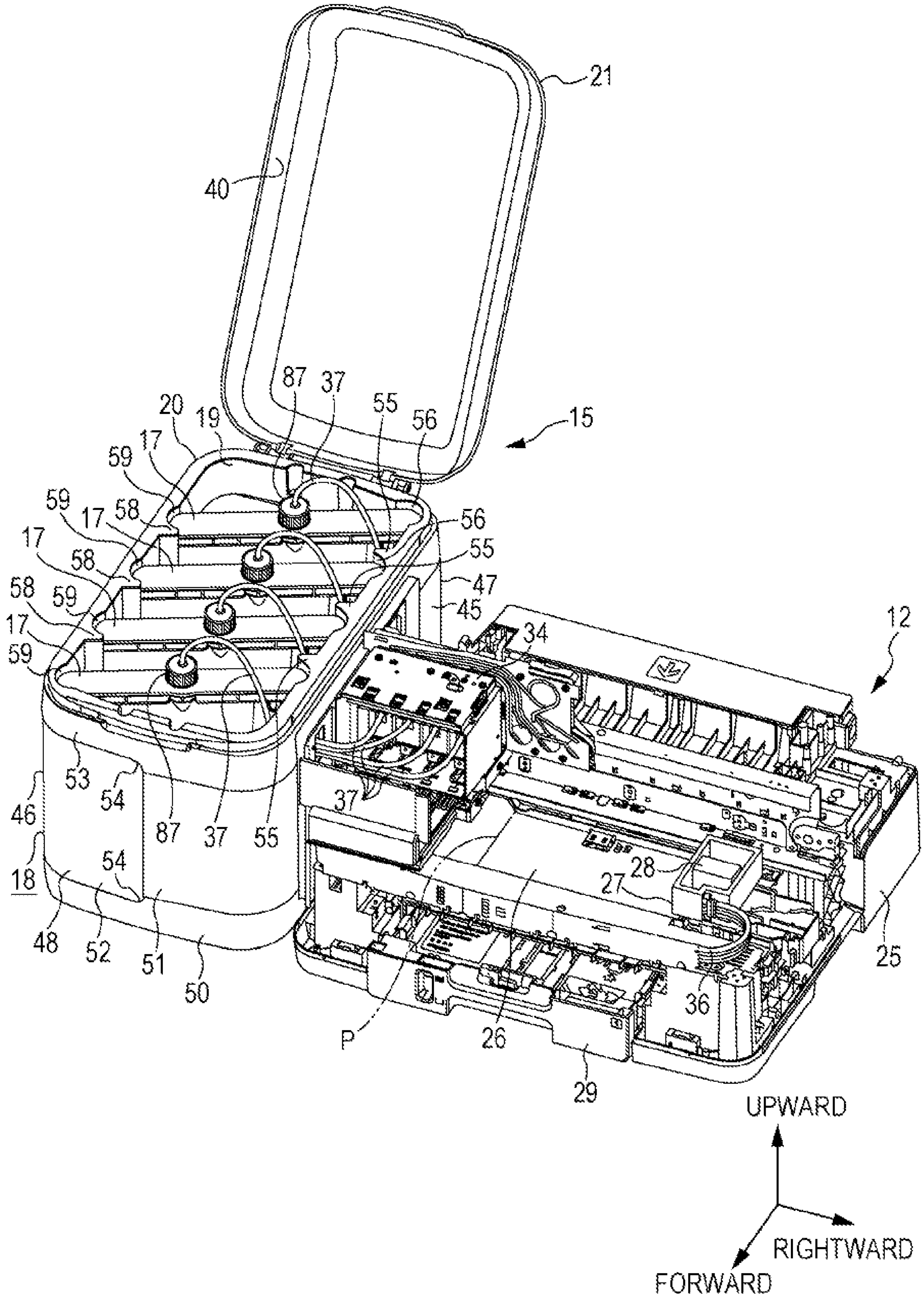
FIG. 3 is a perspective view illustrating the inside of the image forming system.

As illustrated in FIG. 2 and FIG. 3, the ink supply apparatus 15 is arranged to the left of the ink jet printer 12. That is, the ink supply apparatus 15 is arranged sideways to the left of the ink jet printer 12 (the image forming apparatus 14) and is arranged side by side with the corresponding ink jet printer 12 in the leftward and rightward direction.

The ink supply apparatus 15 includes multiple ink accommodating bodies 17 (four bodies according the present embodiment) as one example of a liquid accommodating body that accommodates the ink, each being substantially in the shape of a rectangle, and a case 18 as one example of a liquid-accommodating-body accommodating receptacle that accommodates each liquid ink accommodating body 17. The case 18 includes a main receptacle body 20 and a lid 21. The main receptacle body 20 in the shape of a rectangular box having a bottom long in the forward and backward direction has an opening portion 19 for accommodating each ink accommodating body 17, on top of it. The lid 21 freely covers the opening portion 19 in such a manner that the opening portion 19 is freely opened and closed. Any one of the main receptacle body 20 and the lid 21 is configured from a synthetic resin material.

The four ink accommodating bodies 17 are arranged within the main receptacle body 20 side by side in the forward and backward direction. Then, cyan ink, magenta ink, yellow ink, and black ink are accommodated, in this order forward from the rear, in the four ink accommodation bodies 17, respectively. In this case, the ink accommodating body 17 for black ink with high frequency of use is arranged closest to the front within the main receptacle body 20.

The case 18 is mounted on the left flank of the ink jet printer 12 (the image forming apparatus 14) in a freely attachable and detachable manner in such a manner that the upper surface of the corresponding case 18 is equal in height to the reading surface 13*a* in a state where the lid 21 is closed. At this point, throughout the present specification, the expression "matched in terms of height" is defined as including not only the same height, but also a height difference of 2 cm or less. Then, according to the present embodiment, the height of the case 18 is smaller only by 5 mm than that of the reading surface 13*a*.

As illustrated in FIG. 1 and FIG. 3, the ink jet printer 12 includes a main body case 25 substantially in the shape of a rectangular parallelepiped long in the leftward and right direction. A support 26, which supports a sheet of paper P, as one example of a target described below, is provided in the middle portion within the main body case 25. A carriage 27, which can reciprocate in the leftward and rightward direction that is a scanning direction, is provided over the support 26.

A recording head 28 as one example of a liquid ejecting head is supported within the carriage 27, in such a manner that the recording head 28 is exposed from the lower surface of the carriage 27. The recording head 28 faces the support 26. Then, the recording head 28 ejects ink from multiple nozzles (an illustration thereof is omitted) onto the sheet of paper P that is transported forward from the rear on the support 26, while the carriage 27 moves in the leftward and rightward direction, and thus performs printing on the sheet of paper P.

Furthermore, under the support 26 within the main body case 25, a paper sheet cassette 29 that can accommodate the multiple sheets of paper P being stacked on top of one another is installed in the main body case 25 in a freely attachable and detachable manner from an opening portion 30 provided in the lower front middle portion of the main body case 25. The sheet of paper P within the paper sheet cassette 29 is fed from the rear on the support 26 by a paper feeding mechanism (an illustration thereof is omitted) while being turned upside down one sheet by one sheet.

Then, the sheets of paper P that are printed on the support 26 are sequentially discharged from a paper discharge opening 31 that is configured in a higher region than the paper sheet cassette 29 in the opening portion 30. Moreover, a paper discharge tray 32, which sequentially supports the sheets of paper P that are sequentially discharged from the paper discharge opening 31, is provided over the paper sheet cassette 29 in a manner that freely extends and extracts the paper discharge tray 32 in the forward and backward direction.

Figure 4:
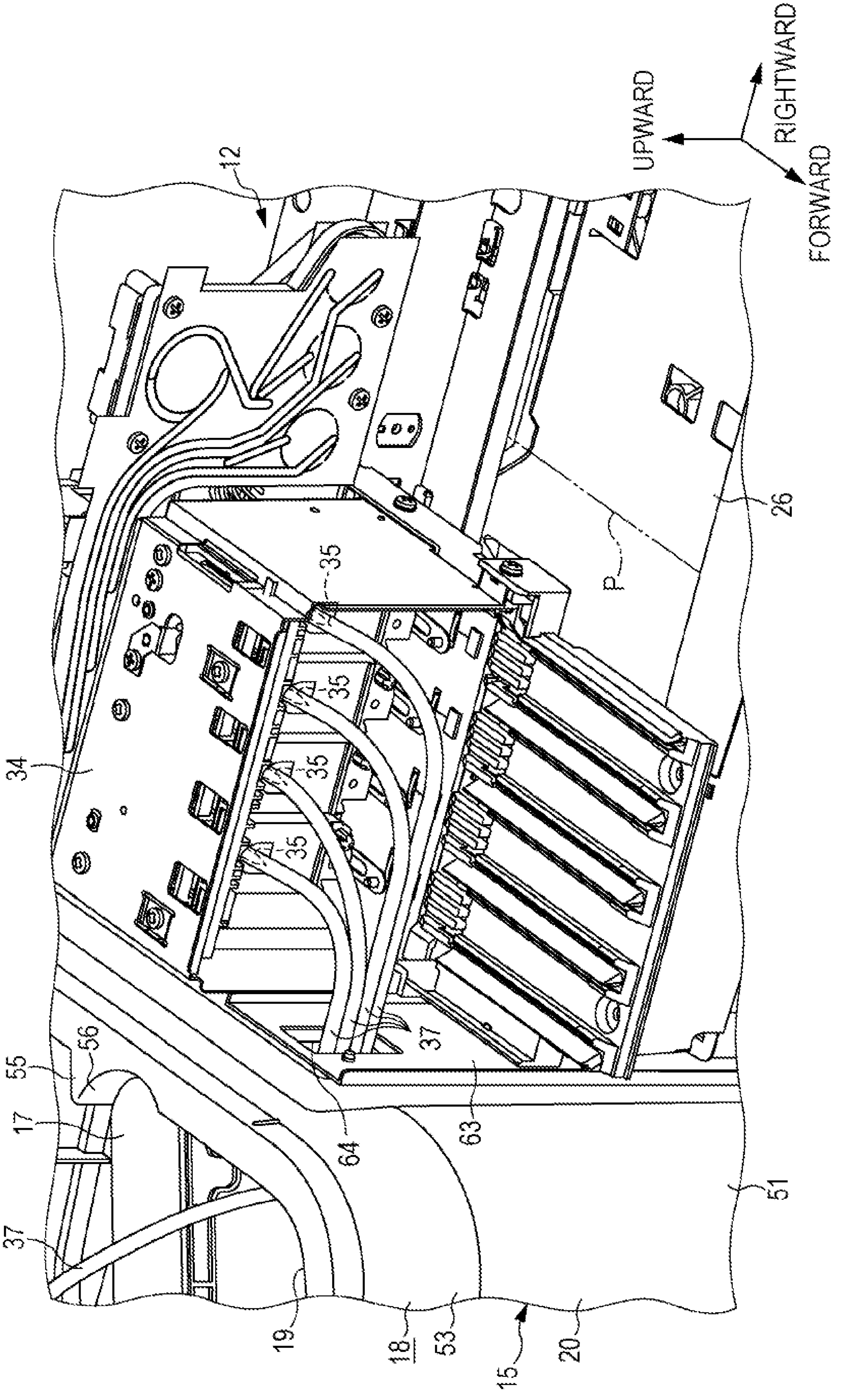
FIG. 4 is a magnified view of essential parts in FIG. 3.

As illustrated in FIG. 3 and FIG. 4, in a left end portion within the main body case 25, there are provided a holder case 34 and multiple hollow ink supply needles 35 (four ink supply needles according to the present embodiment). The holder case 34 takes the shape of a rectangular box that has an opening in the front. The multiple hollow ink supply needles 35 are provided, side by side in the leftward and rightward direction, on a bottom wall (a rear wall) within the holder case 34.

Each ink supply needle 35 extends in the forward and backward direction and passes through a sidewall of the holder case 34. One end of a flexible ink supply tube 36 is connected to a rear end portion of each ink supply needle 35, and the other end of the ink supply tube 36 is connected to the recording head 28. In the ink jet printer 12 according to the present embodiment, cyan ink, magenta ink, yellow ink, and black ink are configured to be supplied in this order rightward from the left to the four ink supply needles 35, respectively.

Then, in a case where an ink color serves as a reference, the order in which the ink supply needles 35 are arranged side by side rightward from the left in the holder case 34 is the same as the order in which the ink accommodating bodies 17 are arranged side by side forward from the rear within the main receptacle body 20. Furthermore, each ink accommodating body 17 and each ink supply needle 35 are connected to each other by a flexible connection tube 37 as one example of a passage member that makes up one portion of the ink supply apparatus 15, in such a manner as to correspond to each color ink that is supplied.

Therefore, each ink that is supplied from each ink accommodating body 17 of the ink supply apparatus 15 through each connection tube 37 to each ink supply needle 35 is supplied to the recording head 28 through each ink supply tube 36.

Next, a configuration of the case 18 is described in detail.

As illustrated in FIG. 2 and FIG. 3, the lid 21 of the case 18 takes the shape of a rectangular box that has an opening portion 40 to the side of the main receptacle body 20 and that is long in the forward and backward direction and is shallower than the main receptacle body 20. The lid 21 is connected to the upper portion of the back side of the main receptacle body 20 through the hinge portion 41. Therefore, in a case of performing an opening or closing operation, the lid 21 rotates with the hinge portion 41 as a fulcrum. That is, the lid 21 is opened from the front of the main receptacle body 20 and is closed to the front of the main receptacle body 20. Moreover, in the lid 21, the opening portion 40 fits neatly over the opening portion 19 in a state where the opening portion 19 of the main receptacle body 20 is closed.

Figure 5:
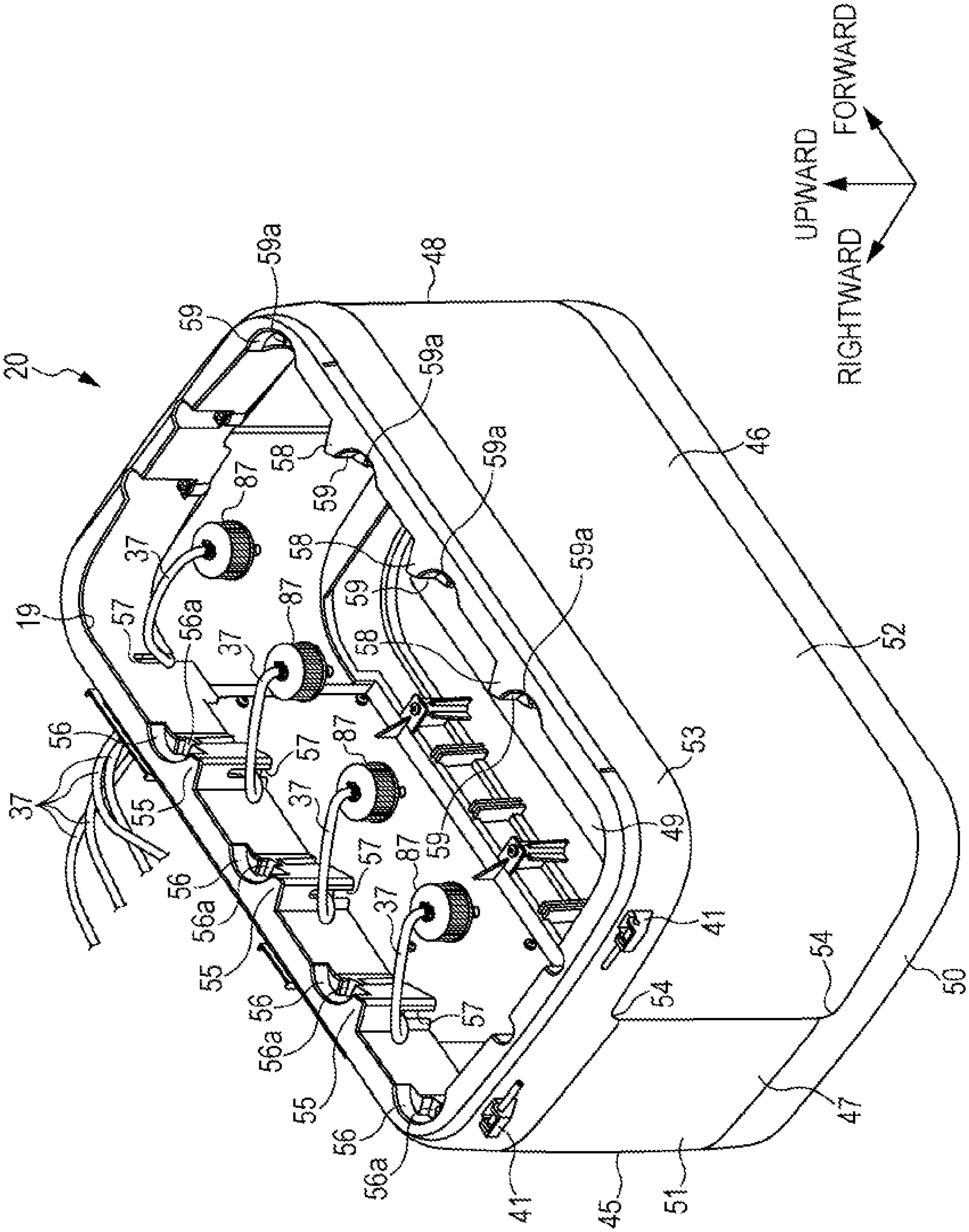
FIG. 5 is a perspective view of a main receptacle body in a case of an ink supply apparatus of the image forming system.

As illustrated in FIG. 3 and FIG. 5, the main receptacle body 20 in the shape of a rectangular box having the bottom includes a right sidewall 45 that is a wall facing the ink jet printer 12, a left sidewall 46 facing the right sidewall 45, a rear sidewall 47 and a front sidewall 48 that orthogonally intersect the right sidewall 45 and the left sidewall 46, and a bottom wall 49 that orthogonally intersects the right sidewall 45, the left sidewall 46, the rear sidewall 47, and the front sidewall 48.

Then, the opening portion 19 is provided in such a manner as to face the bottom wall 49. That is, the opening portion 19 faces the bottom wall 49 and is formed higher in the gravity direction than the bottom wall 49. Then, according to the present embodiment, the right sidewall 45, the left sidewall 46, the rear sidewall 47, and the front sidewall 48 are configured from a first sidewall, a second sidewall, a third sidewall, and a fourth sidewall, respectively. Furthermore, a distance between the right sidewall 45 and the left sidewall 46 in the main receptacle body 20 is smaller than the width of the upper end (one end) of the ink accommodating body 17.

The main receptacle body 20 includes a bottom wall formation member 50 in the shape of a rectangular box having the bottom, which forms the bottom wall 49, a right sidewall formation member 51 in the shape of a plate that forms a right half of the sidewall and is curved substantially like a letter U, a left sidewall formation member 52 in the shape of a plate that forms a left half of the sidewall and is curved substantially like a letter U, and an edge member 53. The bottom of the edge member 53, which makes up a periphery portion of the opening portion 19, takes the shape of a rectangular frame that has an opening in the middle.

Then, the main receptacle body 20 is configured from a combination of the right sidewall formation member 51 as one example of a division member and the left sidewall formation member 52 as one example of the division member. That is, the sidewall of the main receptacle body 20 is configured from a combination of the right sidewall formation member 51 and the left sidewall formation member 52, two division members that result from the division into left and right parts.

The width, in the upward and downward direction, of the left sidewall formation member 52 is somewhat greater than that, in the upward and downward direction, of the right sidewall formation member 51. However, steps 54 are formed in positions corresponding to contact portions, respectively, between the left sidewall formation member 52 and the right sidewall formation member 51 in the lower end portion of the edge member 53 and the upper end portion of the bottom wall formation member 50.

Furthermore, the left sidewall formation member 52 is configured from a transparent synthetic resin material. Therefore, the ink accommodating body 17 accommodated within the main receptacle body 20 becomes visible from the outside of the main receptacle body 20 through the left sidewall formation member 52. Moreover, according to the present embodiment, a visible recognition portion is configured from the left sidewall formation member 52.

As illustrated in FIG. 3, and FIG. 5, right protrusion portions 55 that protrude inward (leftward) are formed on the right internal surface of the edge member 53, according to the number of the ink accommodation bodies 17. Moreover, according to the present embodiment, the three right protrusion portions 55 are formed because the number of ink colors is four and the right protrusion portion 55 is not necessary in the ink accommodating bodies 17 that are arranged closest to the rear. The right protrusions 55 are arranged to be spaced equal distances relative to one another in the forward and backward direction. The right protrusion portions 55 fit neatly with shapes of tongue portions 70 to 72 described below, and take substantially the shape of a triangle box with a lid, of which the bottom has an opening. In this case, each right protrusion portion 55 is substantially in the shape of a triangle when viewed from above, and in two sides of the protruding triangle, the rear side is shorter than the front side.

A right concavity portion 56 as one example of a support portion that supports the ink accommodating body 17 in a support member 92 described below is formed in a chief position on the front side of each right protruding portion 55 on the upper surface of the edge member 53 and in a right rear corner portion. The four right concavity portions 56 are arranged to be spaced equal distances relative to one another in the forward and backward direction and take a shape that fits neatly with the shape of one portion of the support member 92. A notch concavity portion 56*a* is formed in the middle portion of the bottom surface of the right concavity portion 56.

Furthermore, a notch portion 57 as one example of an insertion through-portion that extends facing upward from the lower end is formed in the rear surface in each right protrusion portion 55 and in the vicinity of the right front corner portion in the right internal surface of the edge member 53. The connection tubes 37 in the direction of the ink accommodating bodies 17 can be inserted through the four notch portions 57, respectively. Moreover, the notch portions 57 are arranged to be spaced equal distances relative to one another in the forward and backward direction.

Left protrusion portions 58 that protrude inward (leftward) are formed on the left internal surface of the edge member 53, according to the number of the ink accommodation bodies 17. Moreover, according to the present embodiment, the three left protrusion portions 58 are formed because the number of ink colors is four and the left protrusion portion 58 is not necessary in the ink accommodating bodies 17 that are arranged farthest in the front. Each left protrusion portion 58 is arranged in a position that is shifted somewhat farther to the front than each right protrusion portion 55 in the forward and backward direction. The left protrusion portions 58 are arranged to be spaced equal distances relative to one another in the forward and backward direction. Each left protrusion portion 58 takes substantially the shape of a triangle box with a lid, of which the bottom has an opening. In this case, each left protrusion portion 58 is substantially in the shape of a triangle when viewed from above, and in two sides of the protruding triangle, the rear side is longer than the front side.

A left concavity portion 59 as one example of the support portion that supports the ink accommodating body 17 in the support member 92 described below is formed in a chief position on the rear side of each left protruding portion 58 on the upper surface of the edge member 53 and in a left front corner portion. The four left concavity portions 59 are arranged to be spaced equal distances relative to one another in the forward and backward direction and take a shape that fits neatly with the shape of one portion of the support member 92. A notch concavity portion 59*a* is formed in the middle portion of the bottom surface of each left concavity portion 59. Then, the left concavity portion 59 and the right concavity portion 56 face each other in the direction of intersection at an angle of less than 90 degrees (at an angle of 30 degrees according to the present embodiment) with respect to the leftward and rightward direction.

Figure 6:
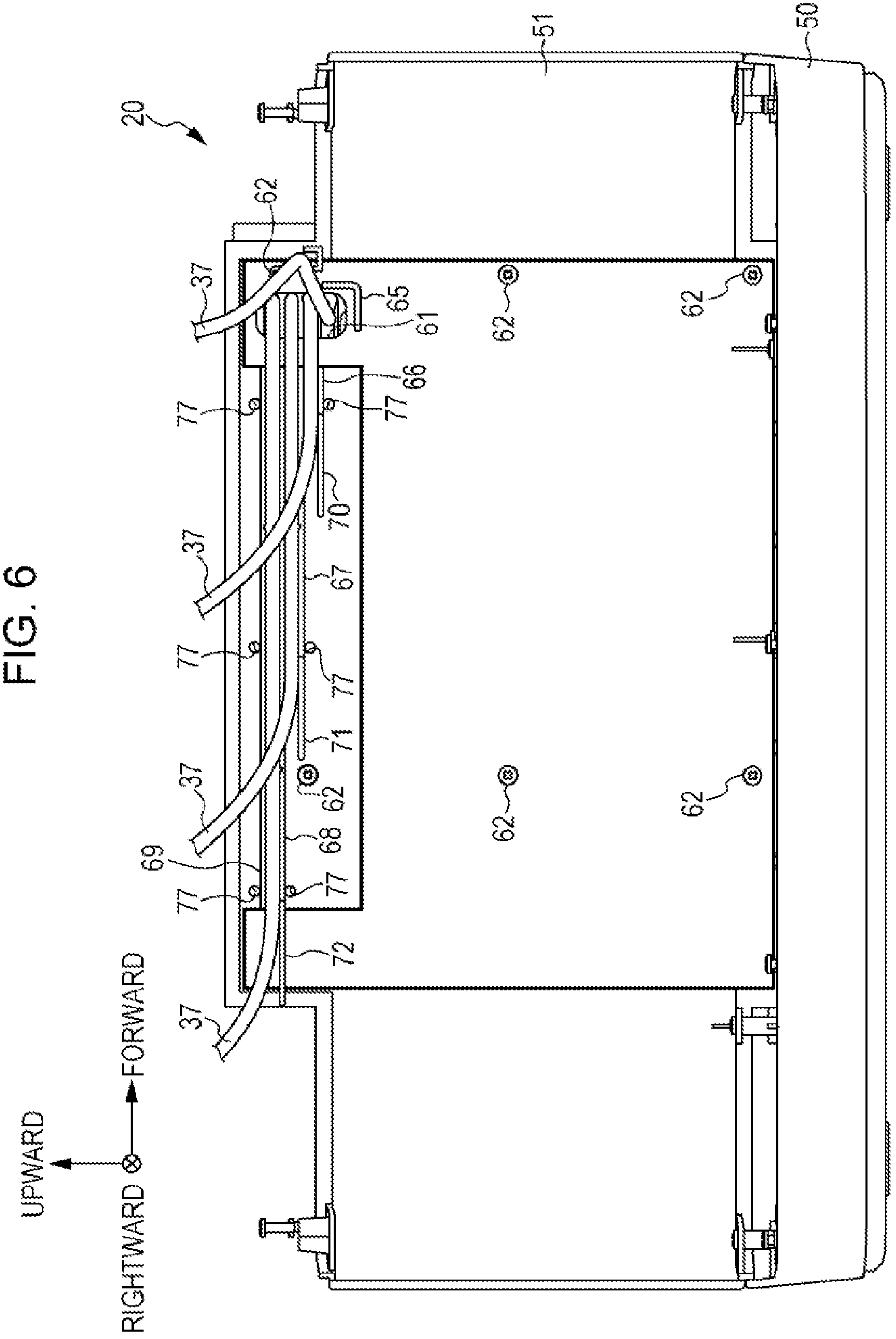
FIG. 6 is a side view of the main receptacle body when viewed from the left.
Figure 7:
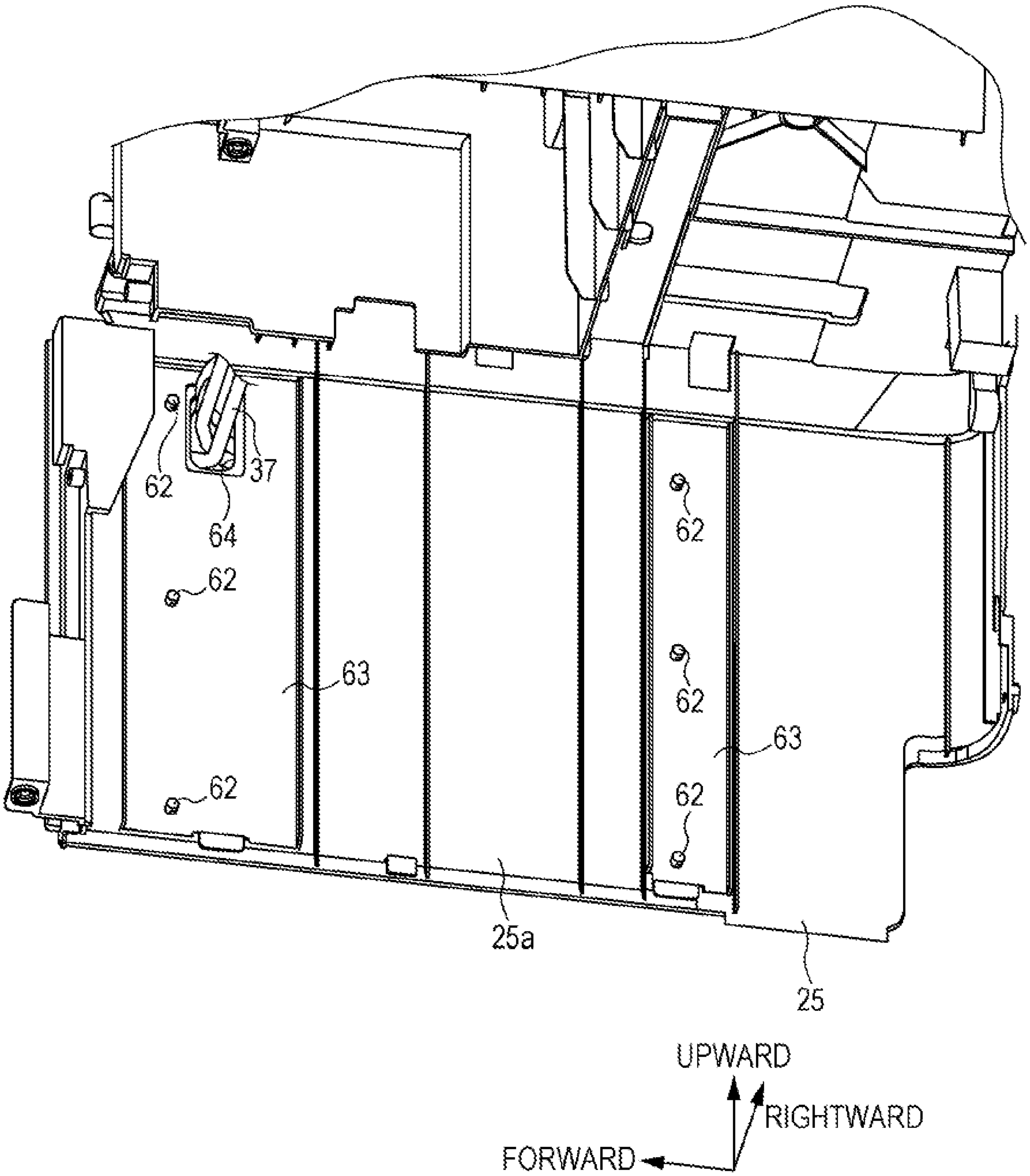
FIG. 7 is a perspective view of the inside of a main body case of an ink jet printer of the image forming system when viewed from the right.

As illustrated in FIG. 6 and FIG. 7, a receptacle-side insertion through-hole 61 as one example of an insertion portion into which each connection tube 37 can be inserted is formed in a near-front position on the upper end portion of the internal surface of the right sidewall formation member 51. The right sidewall formation member 51 is attached to a left sidewall 25*a* of the main body case 25 using multiple screws 62 (six screws according to the present embodiment) from the inside of the main receptacle body 20.

Figure 8:
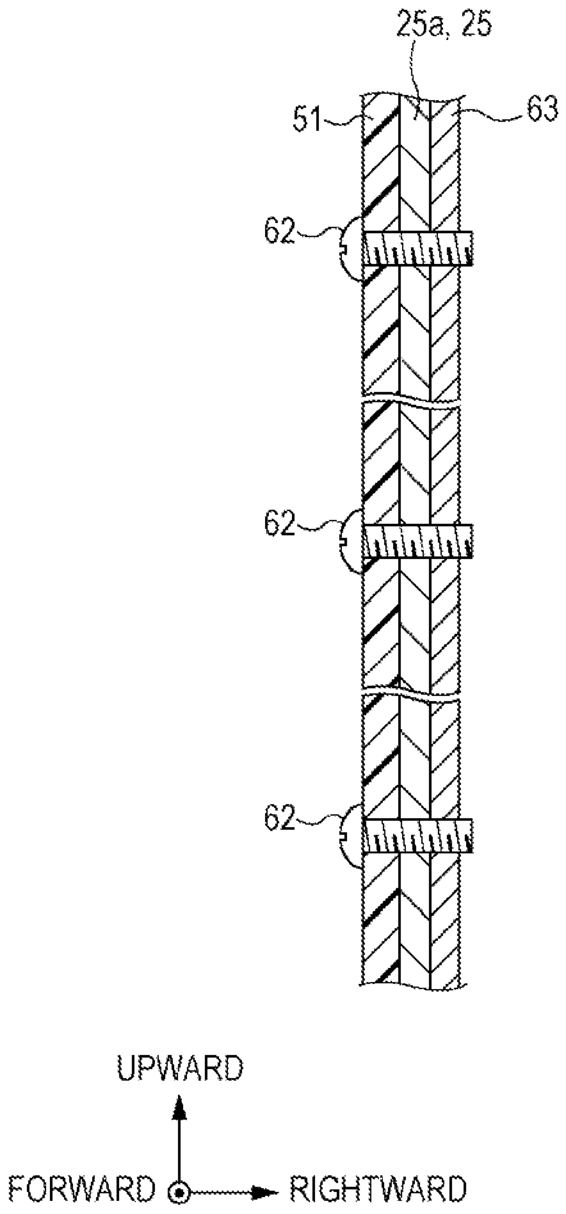
FIG. 8 is a schematic cross-sectional view illustrating a connection part between the ink supply apparatus and the ink jet printer in the image forming system.

In this case, as illustrated in FIG. 7 and FIG. 8, the right sidewall formation member 51 is attached to the left sidewall 25*a* of the main body case 25 by tightening together the left sidewall 25*a* and two sheet metal members 63 in the shape of a rectangle that are arranged on the internal surface of the left sidewall 25*a* with spacing being present between the two sheet metal members in the forward and backward direction, using the six screws 62.

Figure 9:
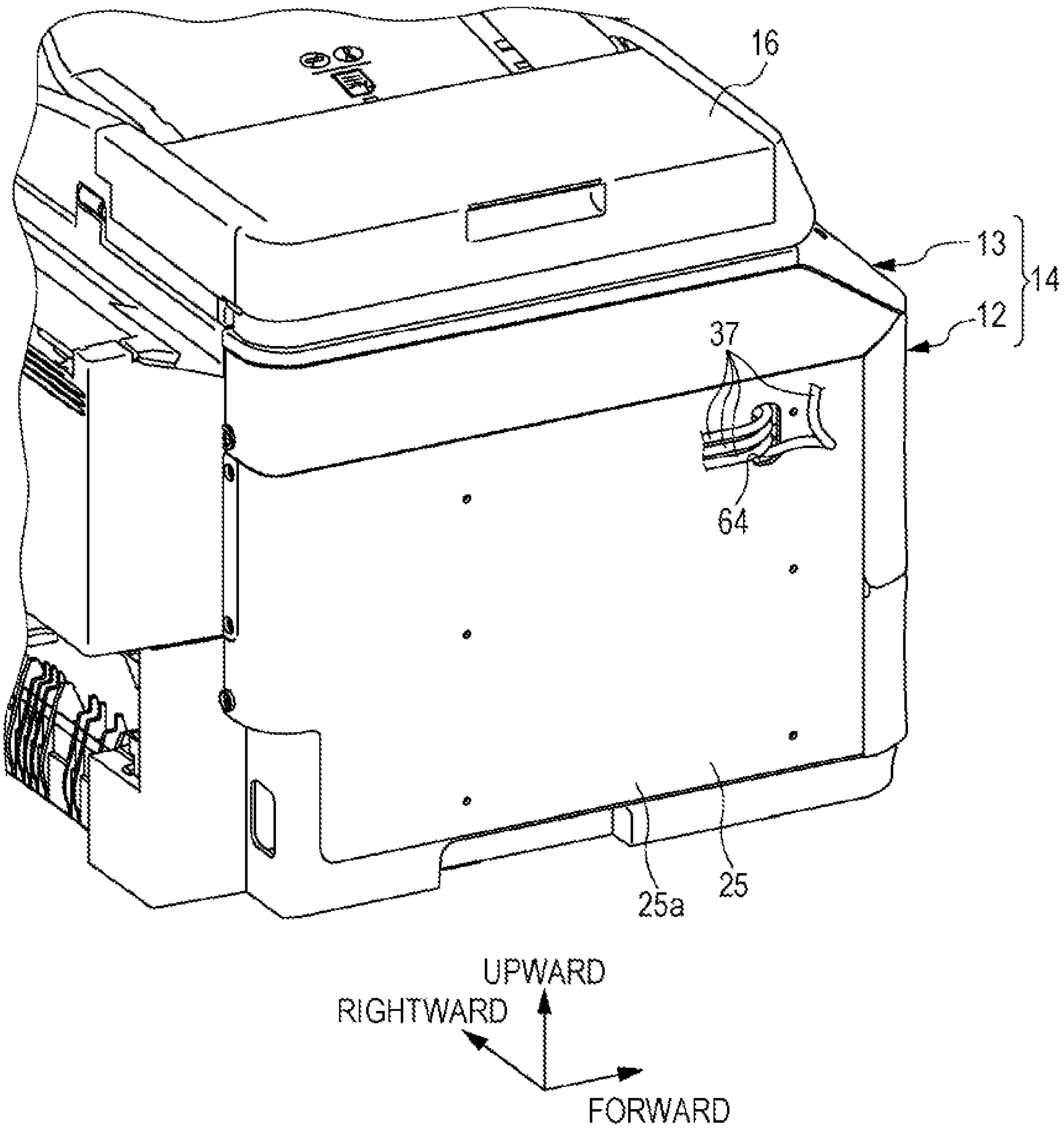
FIG. 9 is a perspective view of the image forming apparatus of the image forming system when viewed from the left.

As illustrated in FIG. 9, a main body case-side insertion through-hole 64 through which each connection tube 37 passes is formed in a position corresponding to the receptacle-side insertion through-hole 61 on the left sidewall 25*a* of the main body case 25. Then, as illustrated in FIG. 4 and FIG. 6, each connection tube 37 of which a downstream end is connected to each the ink supply needle 35 is inserted through the main body case-side insertion through-hole 64 and the receptacle-side insertion through-hole 61, and the upstream end of the connection tube 37 is arranged within the main receptacle body 20.

Figure 10:
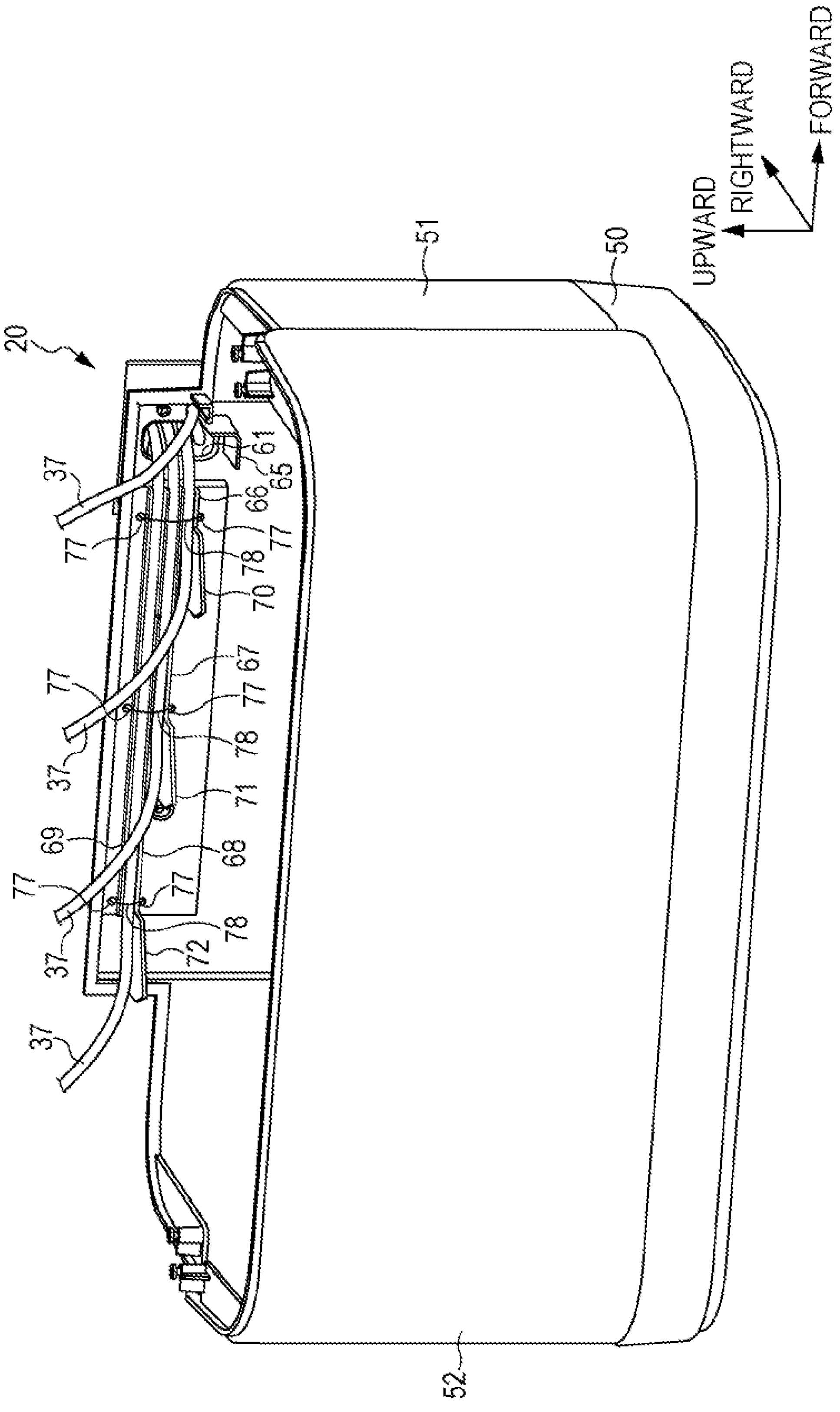
FIG. 10 is a perspective view of the main receptacle body when viewed from the left.
Figure 11:
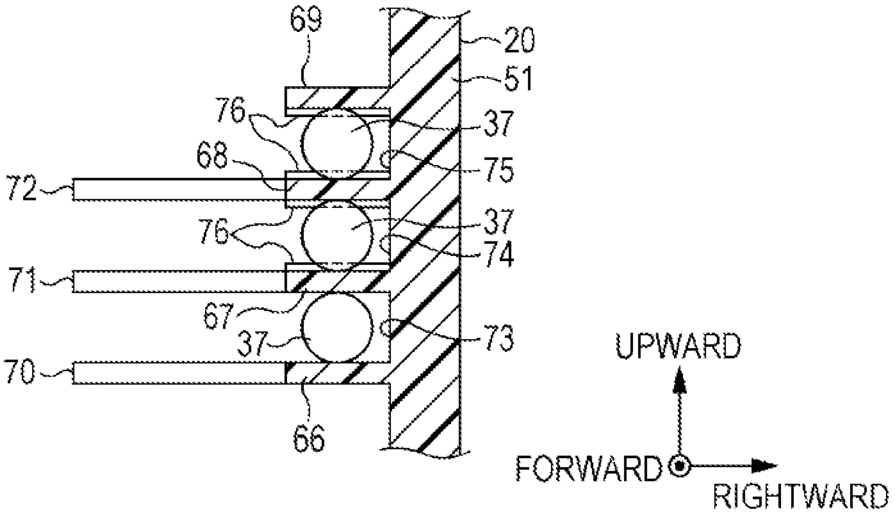
FIG. 11 is a magnified view of essential parts in FIG. 10.

As illustrated in FIG. 10 and FIG. 11, a first tube support portion 65 in the shape of a letter L that supports one connection tube 37 corresponding to black ink, among the connection tubes 37 that are inserted through the receptacle-side insertion through-holes 61, is provided in a position under and in front of the receptacle-side insertion through-hole 61 in the internal surface of the right sidewall formation member 51, in such a manner that the first tube support portion 65 is adjacent to the receptacle-side insertion through-hole 61. Furthermore, in rear of the receptacle-side insertion through-hole 61 in the upper end portion of the internal surface of the right sidewall formation member 51, four ribs in the shape of a plate that extend in parallel with one another in the forward and backward direction are provided horizontally protrusively facing leftward in such a manner that the four ribs are spaced equal distances relative to one another in the upward and downward direction.

Front ends of the four ribs are all uniform with respect to one another, and the four ribs are defined as a first rib 66, a second rib 67, a third rib 68, and a fourth rib 69 in this order upward from the bottom. The length of the first rib 66 is smaller in the forward and backward direction than that of the second rib 67, and the length of the second rib 67 is smaller in the forward and backward direction than that of the third rib 68. Furthermore, the length of the third rib 68 is the same in the forward and backward direction as that of the fourth rib 69.

A first tongue portion 70, a second tongue portion 71, and the third tongue portion 72, as examples of the support portions in the shape of a plate that protrude horizontally greately facing more inward (leftward) than the ribs 66 to 68, are integrally provided on the rear ends of the first rib 66, the second rib 67, and the third rib 68, respectively. The first to third tongue portions 70 to 72 suppress dangling of the connection tubes 37, respectively, by supporting the ends of the connection tubes 37, each of which face the ink accommodating body 17. The tongue portions 70 to 72 are arranged in such a manner that they are spaced equal distances relative to one another in the forward and backward direction, and the more backward the tongue portion faces, the greater the width of the tongue portion in the leftward and rightward direction. In this case, the tongue portions 70 to 72 are arranged in such a manner as to correspond to the right protrusion portions 55 (refer to FIG. 5), respectively, of the edge member 53. Moreover, the tongue portions 70 to 72 are covered with the right protrusion 55 described above, respectively.

A groove formed between the first rib 66 and the second rib 67 is set to be a second tube support portion 73 that supports one connection tube 37 corresponding to yellow ink, among the connection tubes 37. A groove formed between the second rib 67 and the third rib 68 is set to be a third tube support portion 74 that supports one connection tube 37 corresponding to magenta ink, among the connection tubes 37. A groove formed between the third rib 68 and the fourth rib 69 is set to be a fourth tube support portion 75 that supports one connection tube 37 corresponding to cyan ink, among the connection tubes 37.

Therefore, as illustrated in FIG. 3, FIG. 10, and FIG. 11, the first to fourth tube support portions 65, and 73 to 75 guide the connection tubes 37, respectively, between the receptacle-side insertion through-hole 61 and the ink accommodating bodies 17 accommodated within the main receptacle body 20. That is, the connection tube 37 that passes along the first to fourth tube support portions 65, and 73 to 75 goes outside of the main receptacle body 20 through the receptacle-side insertion through-hole 61. Moreover, according to the present embodiment, a guide portion is configured from the first to fourth tube support portions 65, and 73 to 75.

Furthermore, the lengths of the first to fourth tube support portions 65, and 73 to 75 differ from one another according to distances, from the ink accommodating bodies 17 to which the connection tubes 37 guided by the first to fourth tube support portions 65, and 73 to 75 are connected, respectively, to the receptacle-side insertion through-hole 61. That is, among the first to fourth tube support portions 65, and 73 to 75, the fourth tube support portion 75 is the greatest in length, the third tube support portion 74 is the second greatest in length, the second tube support portion 73 is the third greatest in length, and the first tube support portion 65 is the smallest in length.

A pair of upper and lower protrusions 76 as one example of a falling-off suppression portion for suppressing falling off of the connection tube 37, which is pulled into place within the third tube support portion 74 and thus supported, from the third tube support portion 74, is provided in one portion, in the length direction, of the third tube support portion 74.

Furthermore, a pair of upper and lower protrusions 76 for suppressing falling-off of the connection tube 37, which is pulled into place within the fourth tube support portion 75 and thus supported, from the fourth tube support portion 75, is provided in one portion, in the length direction, of the fourth tube support portion 75. Then, each pair of upper and lower protrusions 76 bites into the connection tube 37 that is pulled into place by the third tube support portion 74 and the fourth tube support portion 75. Each protrusion 76 is formed substantially in the shape of a rectangular parallelepiped with the same width in the inward direction (the leftward and rightward direction) as that of each of the ribs 66 to 69.

A pair of through holes 77 as one example of an additional support portion is formed between the first tongue portion 70 and the receptacle-side insertion through-hole 61 in the forward and backward direction of the upper end portion of the internal surface of the right sidewall formation member 51, in such a manner as to interpose the first to fourth ribs 66 to 69 in the upward and downward direction. A pair of through holes 77 is formed between the first tongue portion 70 and the second tongue portion 71 in the forward and backward direction of the upper end portion of the internal surface of the right sidewall formation member 51, in such a manner as to interpose the second to fourth ribs 67 to 69 in the upward and downward direction.

A pair of through holes 77 is formed between the second tongue portion 71 and the third tongue portion 72 in the forward and backward direction of the upper end portion of the internal surface of the right sidewall formation member 51, in such a manner as to interpose the third to fourth ribs 68 to 69 in the upward and downward direction. Then, in a state where the connection tube 37 is pulled into place within each of the second to fourth tube support portions 73 to 75, the connection tube 37 is reliably retained within each of the second to fourth tube support portions 73 to 75 by making wiring 78 pass through each pair of through holes 77 and connecting the end portions of the corresponding wiring 78 in the shape of a ring. Therefore, each pair of through holes 77 is complementary in a case where the connection tube 37 falling-off from within the second to fourth tube support portions 73 to 75 is retained by the wire 78.

As illustrated in FIG. 5, FIG. 10, and FIG. 11, the first to fourth ribs 66 to 69 (the second to fourth tube support portions 73 to 75), the first to third tongue portions 70 to 72, the first tube support portion 65, and the receptacle-side insertion through-hole 61 are covered with the edge member 53. The connection tubes 37 supported by the first to fourth tube support portions 65, and 73 to 75 are inserted through the four notch portions 57, respectively. Then, the upstream end portion of each connection tube 37 is in a state where it is arranged, from each the notch portions 57, within the main receptacle body 20.

Figure 12:
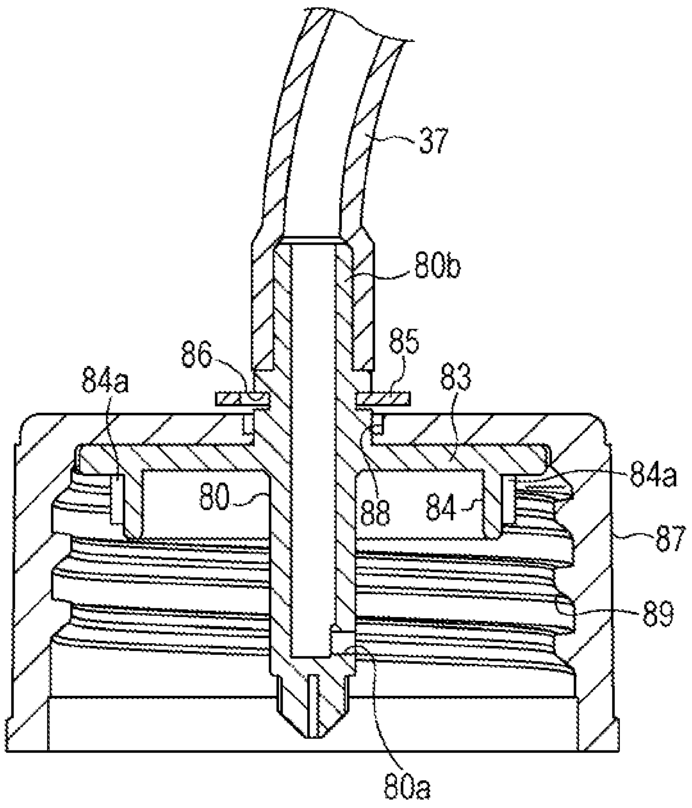
FIG. 12 is a cross-sectional view illustrating a state of a connection between a cap and a connection tube in an ink introduction needle.
Figure 13:
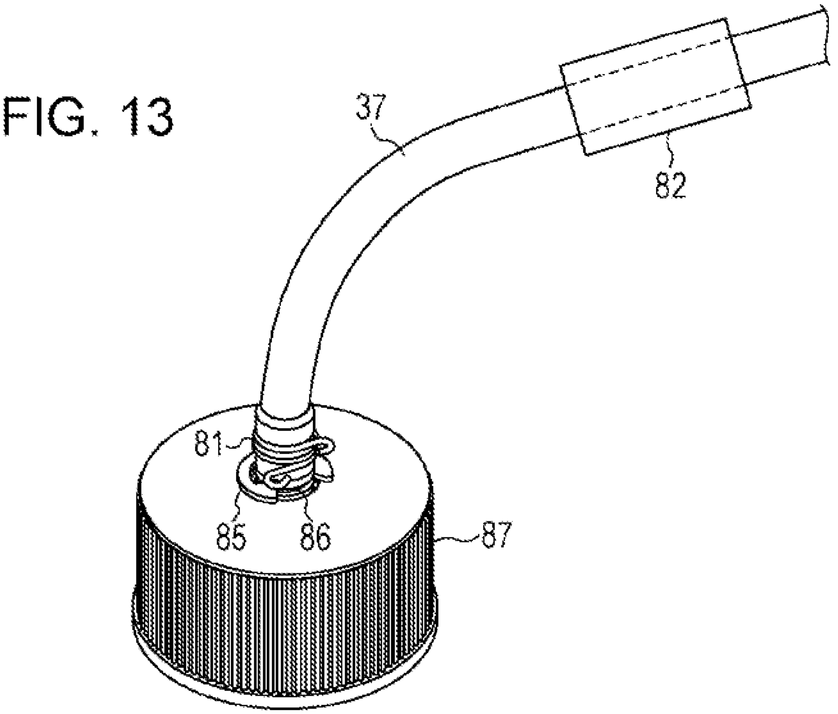
FIG. 13 is a perspective view of the cap and the connection tube in the ink introduction needle illustrated in FIG. 12.

As illustrated FIG. 12 and FIG. 13, a base end portion **80*b* of a hollow ink introduction needle 80, as one example of a liquid introduction portion that has an introduction hole 80*a* in the pointed end portion thereof, is connected to the upstream end of each connection tube 37. That is, the base end portion 80*b* of the ink introduction needle 80 is insertion-fitted into the upstream end portion of each connection tube 37. Then, the part of each connection tube 37, into which the base end portion 80*b* of the ink introduction needle 80 is insertion-fitted, is tightened by a torsion spring 81 that suppresses the slipping of the ink introduction needle 80 out of each connection tube 37**.

An ink circulation adjusting member 82 is attached to a somewhat more downstream position of each connection tube 37 than the torsion spring 81. The ink circulation adjusting member 82 can be switched between a mode in which the circulation of ink within each connection tube 37 is regulated by squeezing each connection tube 37 and a mode in which the circulation of ink within each connection tube 37 is allowed without squeezing each connection tube 37.

Furthermore, the ink introduction needle 80 has a flange portion 83 in the shape of a circle in the middle portion thereof. A needle positioning portion 84 in the shape of a cylinder that is somewhat smaller in diameter than the flange portion 83 is provided on the surface of the flange portion 83, which faces the introduction hole **80*a*. Multiple positioning protrusions 84*a* (four positioning protrusions 84*a* according to the present embodiment) are provided on the outer periphery surface of the needle positioning portion 84, in such a manner that the multiple positioning protrusions 84*a*** are spaced equal distances relative to one another.

The pointed end of each positioning protrusion **84*a* is positioned more inward than the periphery of the flange portion 83. Then, a ring groove 86 in the shape of a circle, into which an E ring 85 can be installed, is formed on a position on the outer periphery surface of the ink introduction needle 80, which is somewhat closer to the base end than the flange portion 83**.

Furthermore, a cap 87 in the shape of a circular box with a lid, of which one side has an opening, in such a manner as to accommodate the region of the ink introduction needle 80, from the flange portion 83 to the pointed end, is attached to the ink introduction needle 80. That is, a cap-insertion through-hole 88, through which the base end of the ink introduction needle 80 can be inserted from within the cap 87 rather than the flange portion 83, is formed in the central portion of the bottom wall of the cap 87. A thread groove 89 is formed in the inner periphery surface of the cap 87.

Then, the cap 87 is mounted to the ink introduction needle 80 by installing the E ring 85 into the ring groove 86 in the ink introduction needle 80 in a state where the base end of the ink introduction needle 80 rather than the flange portion 83 is inserted, from the inside of the cap 87, through the cap-insertion through-hole 88 in the cap 87. At this time, backlash of the ink introduction needle 80 and the cap 87 is suppressed because the bottom wall of the cap 87 is interposed between the flange portion 83 and the E ring 85 with somewhat room in between. Furthermore, at this time, the pointed end of the ink introduction needle 80 is held in place within the cap 87.

Next, a configuration of an ink accommodating body is described in detail.

Figure 14:
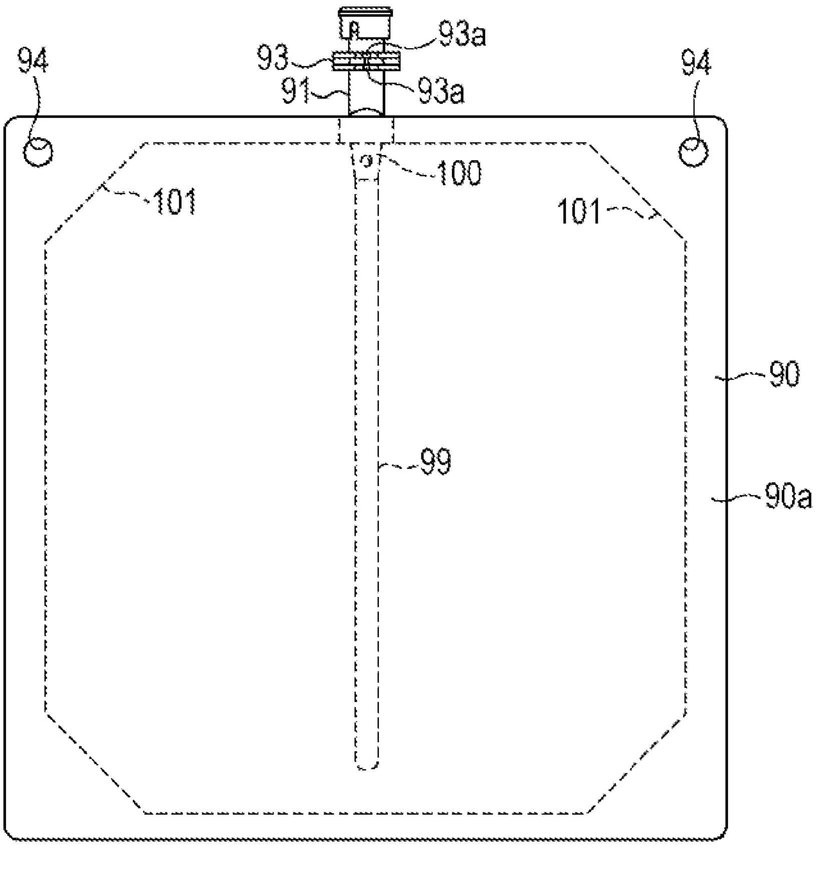
FIG. 14 is a side view of an ink bag on which an ink pulling portion is formed.
Figure 15:
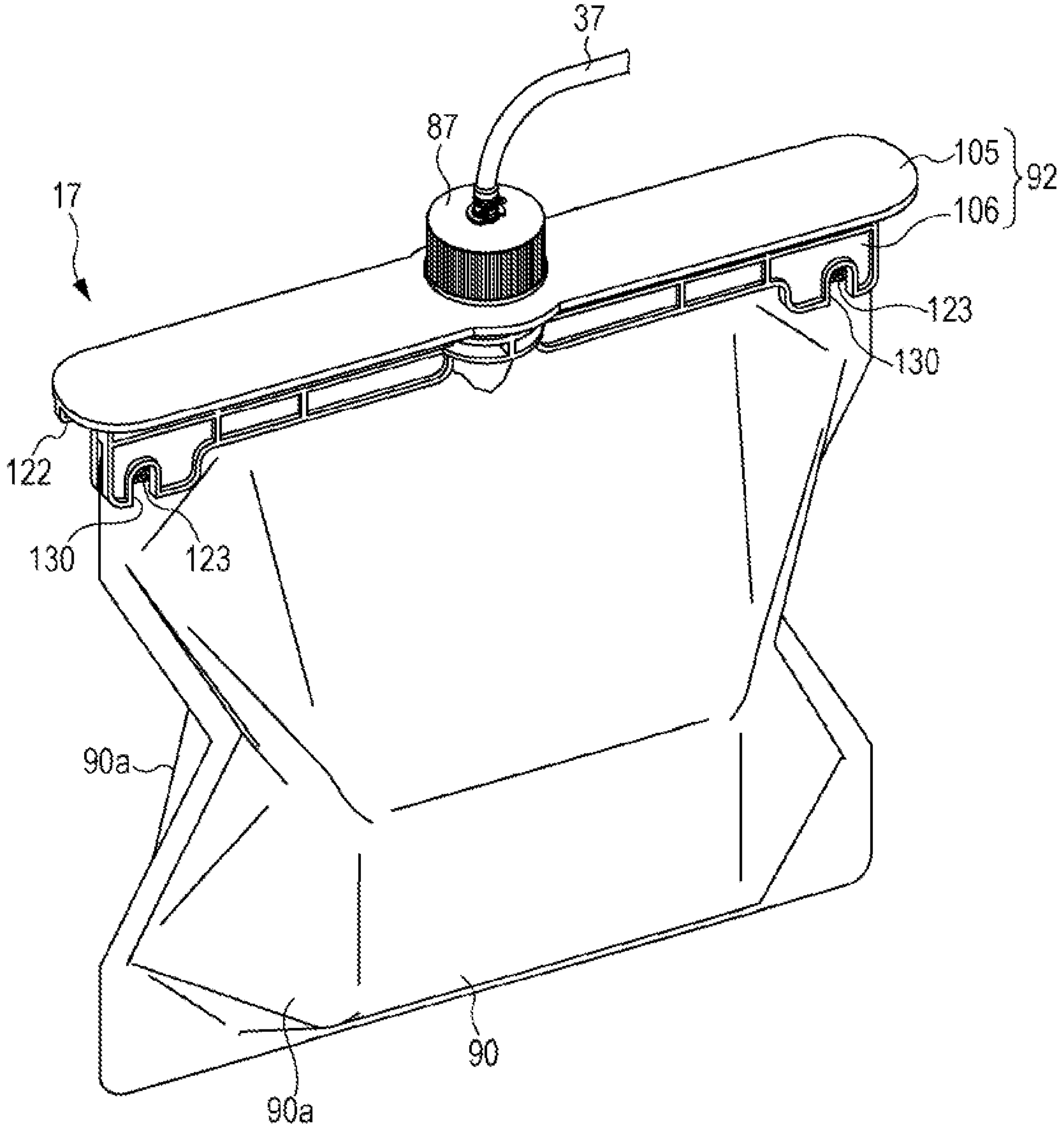
FIG. 15 is a perspective view of an ink accommodating body.

As illustrated in FIG. 14 and FIG. 15, each ink accommodating body 17 includes an ink bag 90 as one example of a liquid accommodation portion that accommodates ink, and an ink pulling portion 91 as one example of a liquid pulling portion that is formed on the upper end portion of the ink bag 90 in such a manner as to communicate with the inside of the ink bag 90. The ink pulling portion 91 is positioned over the ink bag 90 in the gravity direction. Furthermore, a support member (a cover member) 92, which makes up a liquid accommodating body support portion supported by the main receptacle body 20 (refer to FIG. 5), is attached to the upper end (one end) of the ink bag 90, on which the ink pulling portion 91 is formed. That is, the ink bag 90 is engaged with the support member 92.

In a state where the ink pulling portion 91 in the shape of a cylinder is interposed between peripheries of two flexible films 90*a* in the shape of a rectangle, the ink bag 90 is formed by welding the peripheries of the two flexible films. That is, the ink bag 90 is a bag body that is configured from the flexible films 90*a* that are two opposing flexible walls, and is formed in such a manner that as the ink accommodated within the ink bag 90 is consumed, the two flexible films 90*a* become closer to each other. Moreover, according to the present embodiment, a flexible portion is configured from the two flexible films 90*a* that make up the ink bag 90.

Furthermore, the ink pulling portion 91 is arranged in the middle portion, in the width direction, of the upper end portion of the ink bag 90. The upper end portion of the ink pulling portion 91 is exposed from the ink bag 90, and the lower end portion thereof is arranged within the ink bag 90. A pulling flange portion 93 that takes substantially the shape of a square with corner portions rounded is provided in a somewhat lower position than the upper end portion of the part, exposed from the ink bag 90, of the ink pulling portion 91.

Flange concavity portions 93*a* are formed in a pair on both lateral edge portions, respectively, of the pulling flange portion 93 that are opposite to each other in the thickness direction of the ink bag 90. An ink bag through-hole 94 is provided on each of the both end portions, in the width direction, of a welded part of the upper end portion of the ink bag 90, in which ink is not accommodated.

Figure 18:
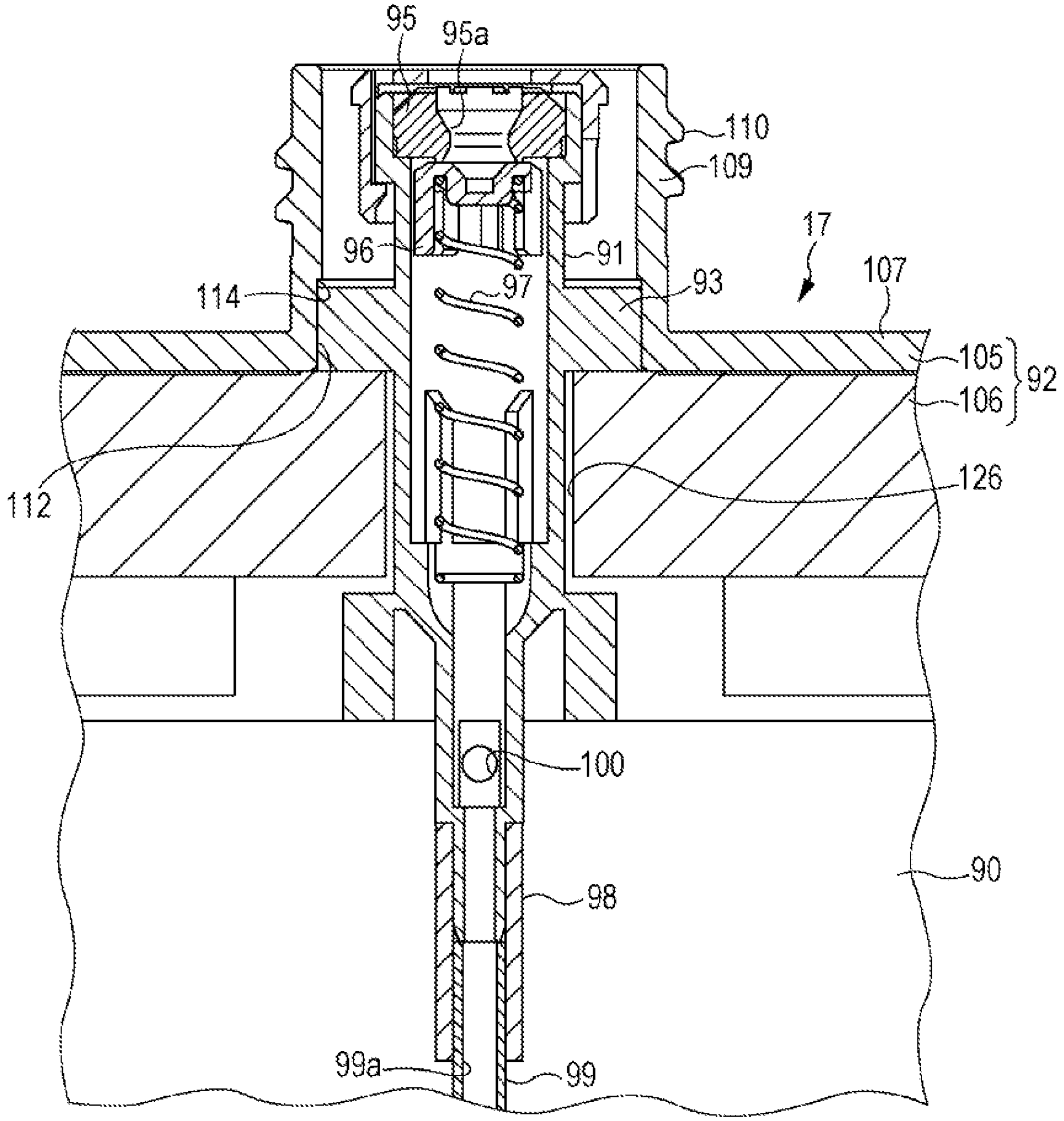
FIG. 18 is a magnified cross-sectional view of essential parts of the ink accommodating body.

As illustrated in FIG. 14 and FIG. 18, the ink pulling portion 91 includes a packing 95 in the shape of a circular, a valve body 96, and a coil spring 97 inside it. The packing 95 forms an ink pulling mouth 95*a* that pulls ink. The valve body 96 comes into contact with the packing 95 in such a manner to close the ink pulling mouth 95*a* from the inside. The coil spring 97 applies an actuation force to the valve body 96 from the inside to the packing 95. The upper end (one end) of an ink pulling tube 99, as one example of a passage formation member that forms a passage 99*a* through a flexible connection passage member 98 that takes the shape of a cylinder, is connected to the lower end portion of the ink pulling portion 91 within the ink bag 90. The connection passage member 98, for example, is configured from an elastomer or the like.

The lower end (the other end) of the ink pulling tube 99 extends up to the lower portion of the ink bag 90 within the ink bag 90. That is, the lower end of the ink pulling tube 99 extends in the direction opposite to the direction in which the ink pulling portion 91 is formed, within the ink bag 90. Therefore, the passage 99*a* within the ink pulling tube 99 extends up to the lower portion of the ink bag 90 in the gravity direction within the ink bag 90.

In this case, the length of the ink pulling tube 99 is set to be such a length that the lower end of the ink pulling tube 99 does not come into contact with the lower end of the ink bag 90 within the ink bag 90 in a state where the ink bag 90 is filled with ink. Then, the ink pulling tube 99 is configured from a material that is greater in specific gravity than the ink with which the ink bag 90 is filled. According to the present embodiment, the ink pulling tube 99 is configured from ink-resistant fluororesin.

The fluororesin is selected, for example, from among PFA (tetrafluoro ethylene perfluoroalkyl vinyl ether copolymer with a specific gravity of 2.12 to 2.17), PTFE (polytetrafluoroethylene (4 fluoridation) with a specific gravity of 2.14 to 2.20), FEP (tetrafluoro ethylene hexafluoropropylene copolymer (4.6 fluoridation) with a specific gravity of 2.12 to 2.17), ETFE (tetrafluoro ethylene ethylenic copolymer with a specific gravity of 1.70 to 1.76), PCTFE (polychloro-trifluoroethylene (3 fluoridation) with a specific gravity of 2.10 to 2.20), PVDF (poly vinylidene fluoride (2 fluoridation) with a specific gravity of 1.75 to 1.78), and the like.

Because ink, when it is water-based ink, is approximately 1 in specific gravity, if the ink pulling tube 99 is configured as described above, the floating of the ink pulling tube 99 is prevented in the ink within the ink bag 90. Because the ink in the vicinity of the bottom portion of the ink bag 90 within the ink bag 90 is accordingly smoothly pulled, the ink remaining within the ink bag 90 is reduced.

Furthermore, a communication hole 100, which communicates with the inside of the ink pulling portion 91 and the inside of the ink bag 90, is formed in the part of the ink pulling portion 91, which extends to within the ink bag 90. Then, an inclination portion 101, as one example of a guide portion that is inclined in such a manner as to ascend toward the communication hole 100, is formed in both end portions, in the width direction, of the upper end portion of the inside of the ink bag 90.

The communication hole 100 is formed in such a manner that the hole diameter of the communication hole 100 is smaller than the entrance diameter of an ink entrance in the lower end (in the direction opposite to the ink pulling portion 91) of the ink pulling tube 99. In a case where ink is the pigment ink, there occurs a problem in that pigment precipitates to the bottom portion of the ink bag 90 within the ink bag 90 and thus a difference in concentration occurs between the previously-supplied ink and the later-supplied ink. However, with the configuration described above, the ink in the upper portion of the ink bag 90, which is low in concentration, is introduced from the communication hole 100 and the ink in the lower portion of the ink bag 90, which is high in concentration, is introduced from the ink pulling tube 99. As a result, there is an effect in which the high-concentration ink and the low-concentration ink are mixed and thus the ink with moderate concentrations are delivered to the ink pulling portion 91.

Figure 16:
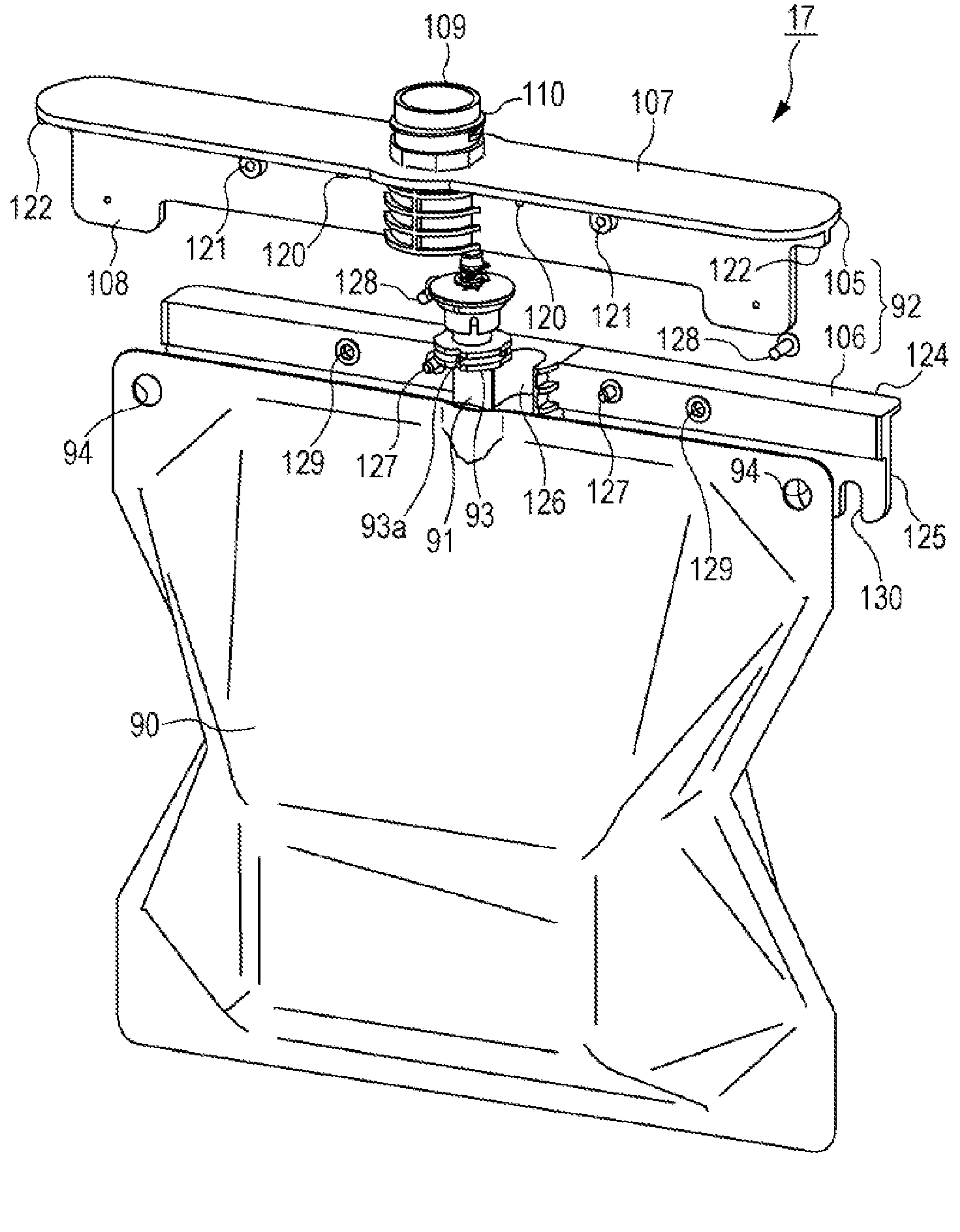
FIG. 16 is an exploded perspective view of the ink accommodating body.
Figure 17:
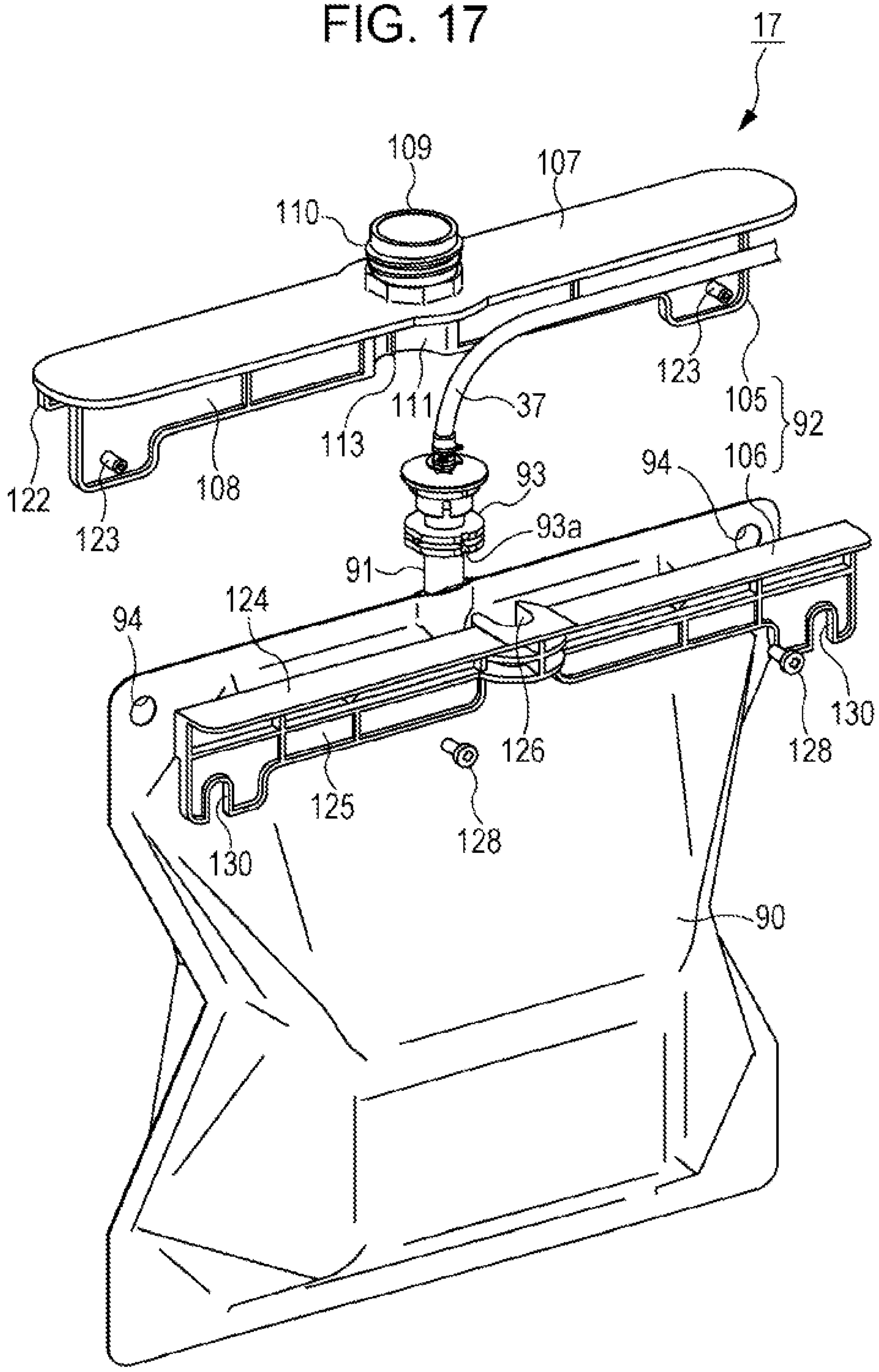
FIG. 17 is an exploded perspective view of the ink accommodating body in FIG. 16 when viewed from the opposite direction.

As illustrated in FIG. 16 and FIG. 17, the support member 92 of each ink accommodating body 17 includes a first support member 105 and a second support member 106 that are attached to each other in such a manner that the upper end portion of the ink bag 90 is interposed therebetween. The first support member 105 includes a top plate portion 107 that takes substantially the shape of a rectangle that extends in the width direction of the ink bag 90, and a lateral plate portion 108 that is provided on the middle portion, in the transverse direction, of the lower surface of the top plate portion 107, vertically and integrally, in such a manner as to extend along the longitudinal direction.

Figure 20:
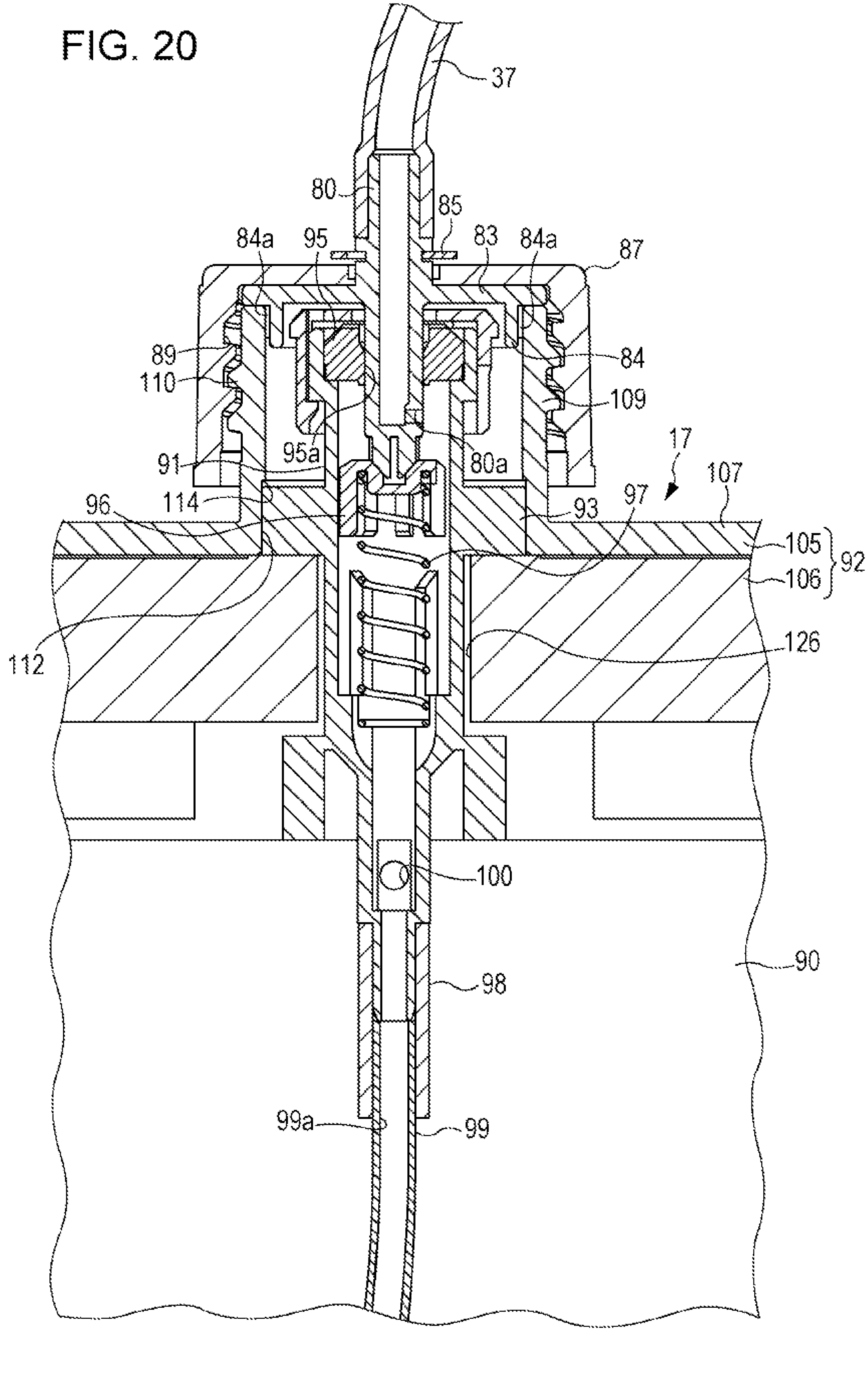
FIG. 20 is a magnified cross-sectional view of a state where the ink pulling needle is connected to the ink pulling portion of the ink accommodating body.

As illustrated in FIG. 16 and FIG. 20, both end portions of the top plate portion 107 of the first support member 105 takes substantially the shape of an arc, and a pulling-portion insertion portion 109 in the shape of a cylinder is formed on the middle portion, in the longitudinal direction, of the top plate portion 107, in such a manner that the pulling-portion insertion portion 109 into which the ink pulling portion 91 is inserted is formed passes through the middle portion. A thread ridge 110 that can cooperate with the thread groove 89 of the cap 87 for screwing is formed in the outer periphery surface of the pulling-portion insertion portion 109. Therefore, the cap 87 can be screwed onto the pulling-portion insertion portion 109.

The outer diameter of the pulling-portion insertion portion 109 is almost the same as that of the flange portion 83 of the ink introduction needle 80. The inner diameter of the pulling-portion insertion portion 109 is greater than the outer diameter of the needle positioning portion 84 of the ink introduction needle 80. The inner diameter of the needle positioning portion 84 is somewhat greater than the outer diameter of the upper end portion of the ink pulling portion 91.

Figure 19:
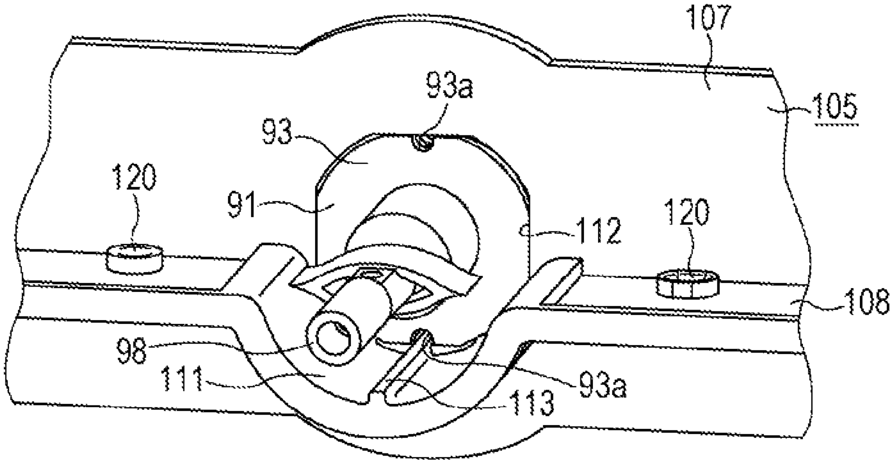
FIG. 19 is a magnified perspective view illustrating a state where a first support member and the ink pulling portion are engaged with each other.

As illustrated in FIG. 18 and FIG. 19, a semi-arc surface 111 that runs along one portion of the pulling-portion insertion portion 109 is formed in the part of the lateral plate portion 108 of the first support member 105, which corresponds to the pulling-portion insertion portion 109. An insertion-fitting hole 112, into which the pulling flange portion 93 of the ink pulling portion 91 can be insertion-fitted, in the end portion of the pulling-portion insertion portion 109, which faces the semi-arc surface 111. The insertion-fitting hole 112 takes substantially the shape of a square of which the corner portions are rounded in such a manner as to correspond to the pulling flange portion 93.

A convexity rim 113, which extends in the upward and downward direction, is formed in the part from the middle portion of the semi-arc surface 111 to the insertion-fitting hole 112. A level-difference portion 114, which is engaged with the pulling flange portion 93 of the ink pulling portion 91 in the upward and downward direction, is formed in the upper end portion of the insertion-fitting hole 112. Then, in a case where the ink pulling portion 91 is inserted into the pulling-portion insertion portion 109, the pulling flange portion 93 is insertion-fitted into the insertion-fitting hole 112, and the convexity rim 113 is fitted into the flange concavity portion 93*a* of the pulling flange portion 93, thereby performing the positioning of the ink pulling portion 91.

As illustrated in FIG. 16 and FIG. 17, positioning holes 120 are provided in both sides of the lateral plate portion 108, respectively, of the first support member 105. The both sides interpose the semi-arc surface 111 therebetween. Furthermore, screw holes 121 are formed in both sides of the lateral plate portion 108, which interposes the positioning hole 120 therebetween. A protrusion piece portion 122 in the shape of a plate, which is formed to be integrally combined with the lateral plate portion 108, is provided on the lower surfaces of both end portions of the top plate portion 107 of the first support member 105. Furthermore, convexity portions 123 in the shape of a cylinder, which are inserted through both of the ink bag through-holes 94 of the ink bag 90, are protrusively provided in both end portions, respectively, of the surface of the lateral plate portion 108. The surface faces the semi-arc surface 111.

The second support member 106 includes a vertical portion 124 in the shape of rectangular plate and a vertical portion 125 in the shape of a rectangular plate. The vertical portion 124 takes substantially the shape of a letter L, extends along the width direction of the ink bag 90, and faces the lower surface of the top plate portion 107 of the first support member 105. The vertical portion 125 faces the lateral plate portion 108 of the first support member 105.

A support concavity portion 126 is provided in a position on the second support member 106, which corresponds to the semi-arc surface 111 of the lateral plate portion 108 of the first support member 105. The part of the ink pulling portion 91 (the part that faces the ink bag 90 rather than the pulling flange portion 93, in a part of the ink pulling portion 91, which is exposed from the ink bag 90), which is immediately under the pulling flange portion 93, is inserted into the support concavity portion 126. The support concavity portion 126 is smaller in width than the pulling flange portion 93 of the ink pulling portion 91.

Positioning protrusions 127, which are inserted into both of positioning holes 120, respectively, are protrusively provided in positions on the vertical portion 125 of the second support member 106, which correspond to both of the positioning holes 120, respectively, of the first support member 105. Screw-insertion through-holes 129 are formed in positions on the vertical portion 125 of the second support member 106, which correspond to both of the screw holes 121, respectively, in the first support member 105. Screws 128, which are screwed into both of the screw holes 121, respectively, are inserted through the screw-insertion through-holes 129, respectively.

Engagement notch concavity portions 130, which are engaged with both of the convexity portions 123 that are inserted through both of the ink bag through-holes 94, respectively, are formed in positions on the vertical portion 125 of the second support member 106, which correspond to both of the convexity portions 123, respectively, of the first support member 105.

Next, operation that is performed when the support member 92 is attached to the ink bag 90 to which the ink pulling portion 91 is fixed is described.

Then, as illustrated in FIG. 16 and FIG. 17, in a case where the support member 92 is attached to the ink bag 90 to which the ink pulling portion 91 is fixed, first, the ink pulling portion 91 is inserted into the support concavity portion 126 of the second support member 106. Subsequently, both of the convexity portions 123 of the first support member 105 are inserted through both of the ink bag through-holes 94 in the ink bag 90, respectively. Subsequently, both of the positioning protrusions 127 of the second support member 106 are inserted into both of the positioning holes 120 in the first support member 105, respectively. Accordingly, the positioning of the first support member 105 and the second support member 106 is performed.

Subsequently, both of the screws 128 are inserted into both of the screw-insertion through-holes 129 in the second support member 106 and are then screwed into both of the screw holes 121 in the first support member 105. Accordingly, the support member 92 is attached to the ink bag 90 to which the ink pulling portion 91 is fixed. At this time, in the upward and downward direction, the support member 92 engages the pulling flange portion 93 of the ink pulling portion 91 and engages the ink bag through-holes 94 in both of the sides of the ink bag 90, which interpose the ink pulling portion 91 therebetween. That is, the support member 92 supports the ink pulling portion 91 and supports the ink bag 90 with both of the sides of the ink bag 90, which interpose the ink pulling portion 91 therebetween.

Figure 21:
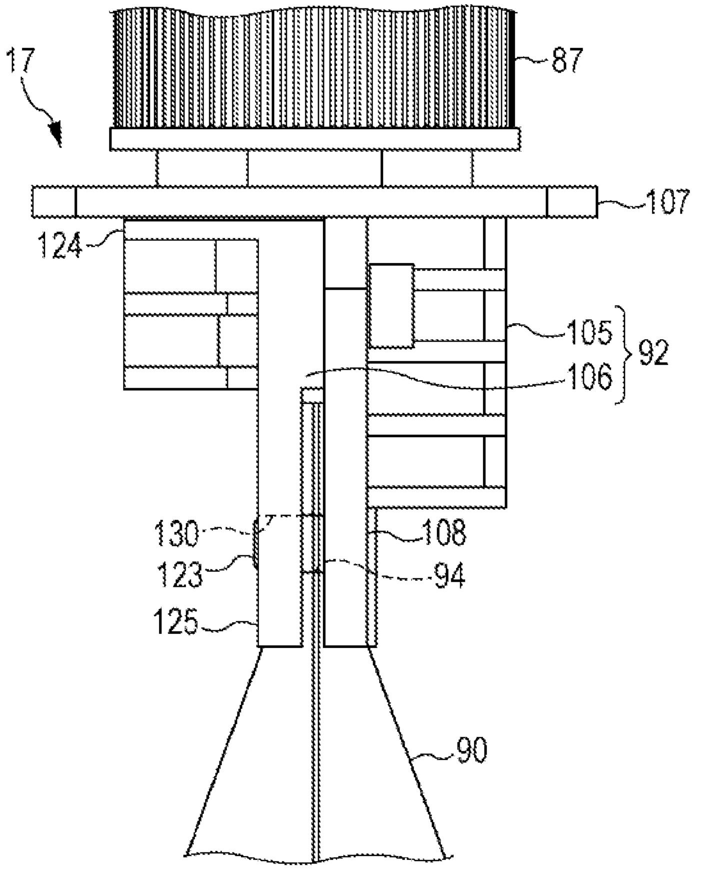
FIG. 21 is a magnified side view of essential parts of the ink accommodating body.

Furthermore, at this time, as illustrated in FIG. 21, the upper portion of the ink bag 90 is arranged between a space formed between the lateral plate portion 108 of the first support member 105 and a vertical portion 125 of the second support member 106. Because of this, even though the ink bag 90 is deformed due to consumption of ink within the ink bag 90, the lateral plate portion 108 and the vertical portion 125 do not prevent the corresponding deformation.

Next, operation that is performed when each ink accommodating body 17 of which the inside is filled with ink is set up in the case 18 is described.

Figure 22:
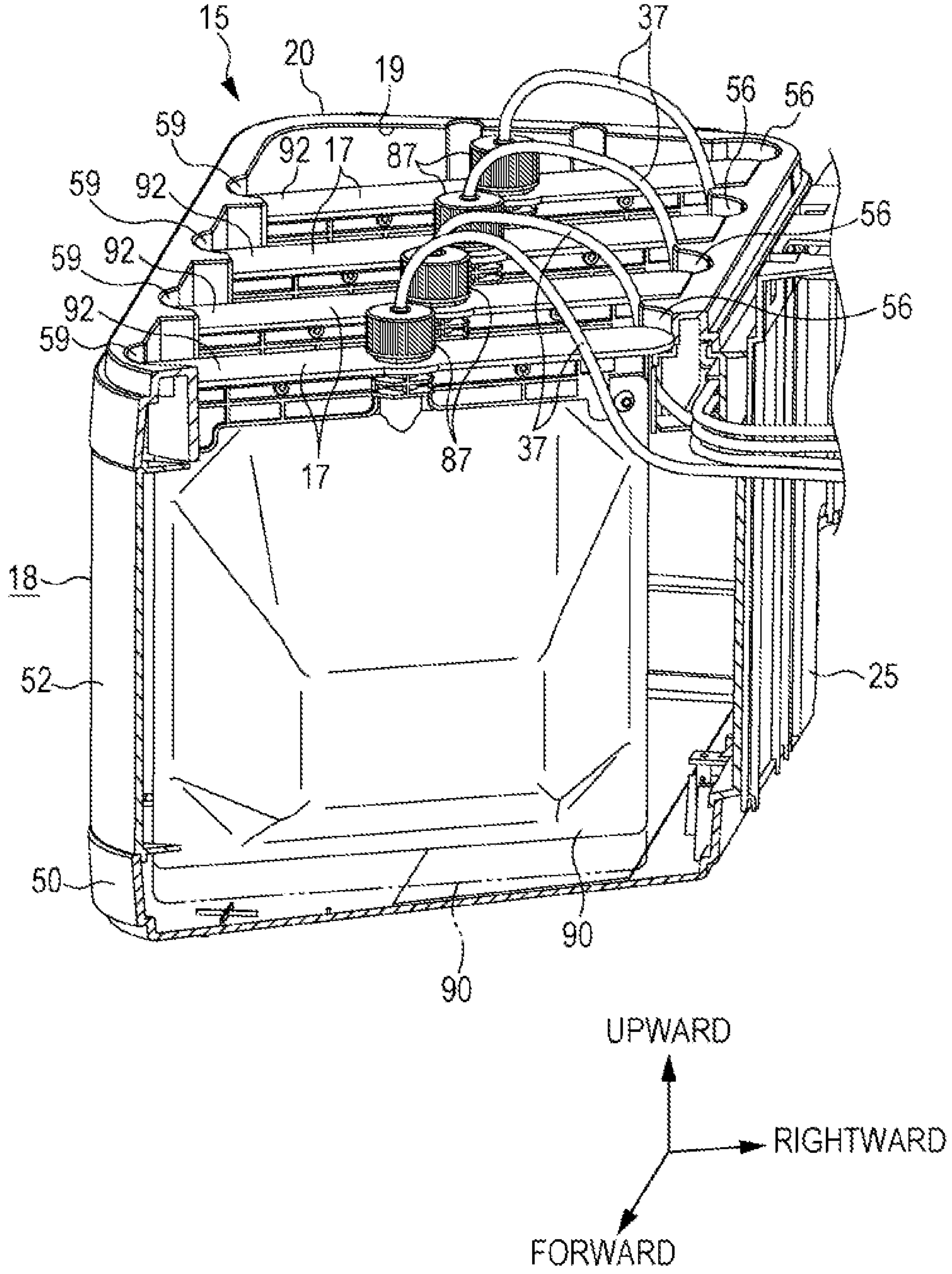
FIG. 22 is a perspective partial-fracture view of a state of the inside of the ink supply apparatus when viewed from front.

Then, as illustrated in FIG. 3 and FIG. 22, in a case where each ink accommodating body 17 is set up in the case 18, first, the lid 21 is opened and the ink accommodating body 17 is accommodated within the main receptacle body 20 through the opening portion 19 in the main receptacle body 20. At this time, both of the end portions of the first support member 105 of each ink accommodating body 17 are supported by the right concavity portion 56 and the left concavity portion 59 that face each other in the direction of intersection at an angle of 30 degrees inclined with respect to the leftward and rightward direction.

When this is done, both of the protrusion piece portions 122 (refer to FIG. 16) of the first support member 105 are inserted into the notch concavity portion 56*a* (refer to FIG. 5) and the notch concavity portion 59*a* (refer to FIG. 5), respectively. Accordingly, the ink accommodating bodies 17 are accommodated side by side with one another in the forward and backward direction in a state where the ink accommodating bodies 17 are supported by the main receptacle body 20 attachably and detachably in such a manner as to intersect each other at an angle of 30 degrees inclined with respect to the leftward and rightward direction. In this case, each ink accommodating body 17 remains suspended by the right concavity portion 56 and the left concavity portion 59 of the main receptacle body 20 in the support member 92 that is positioned to the upper end (one end) of each ink accommodating body 17.

Because of this, each ink accommodating body 17 remains suspended from the internal bottom surface of the main receptacle body 20. Then, in a state where each ink accommodating body 17 is suspended in the main receptacle body 20, the support member 92 supports the pulling flange portion 93 of the ink pulling portion 91 (refer to FIG. 16) and supports the ink bag 90 using the ink bag through-holes 94 in both of the sides of the ink bag 90, which interpose the ink pulling portion 91, fixed to the ink bag 90, therebetween.

Furthermore, for each ink accommodating body 17, the smaller the thickness of the ink bag 90 becomes due to consumption of the ink within the ink bag 90, the farther the lower end of the ink bag 90 goes down (this is indicated by a two-dot chain line in FIG. 22), but even though the ink is not present within the ink bag 90, the state where each ink accommodating body 17 is suspended from the internal bottom surface of the main receptacle body 20 is maintained.

Subsequently, as illustrated in FIG. 12, FIG. 18, and FIG. 20, the ink introduction needle 80, as described above, is connected to the ink pulling portion 91 of each ink accommodating body 17 that is accommodated in the main receptacle body 20. That is, in a case where the ink introduction needle 80 is connected to the ink pulling portion 91, the cap 87 that is attached to the ink introduction needle 80 to which the upstream of each connection tube 37 is connected is put on top of the pulling-portion insertion portion 109 of each ink accommodating body 17.

Subsequently, as illustrated in FIG. 20, the cap 87 is rotated and thus the thread groove 89 in the cap 87 is screwed onto the thread ridge 110 of the pulling-portion insertion portion 109. As the screwing progress, the ink introduction needle 80 is inserted, from the ink pulling mouth 95*a*, into the inside of the ink pulling portion 91. Then, when the cap 87 is further rotated and thus the cap 87 is completely screwed onto the pulling-portion insertion portion 109 to the end, the ink introduction needle 80 resists an actuation force of the coil spring 97 and thus pushes down the valve body 96 in such a manner as to separate the valve body 96 from the packing 95.

When this is done, the valve body 96 is moved to a valve opening position that is away from the packing 95, and thus the inside of the ink bag 90 and the inside of the ink introduction needle 80 communicate with each other. Therefore, the inside of the ink bag 90 communicates with the inside of the connection tube 37 through the inside of the ink pulling portion 91 and the inside of the ink introduction needle 80. At this time, the needle positioning portion 84 of the ink introduction needle 80 is inserted into the pulling-portion insertion portion 109, and each positioning protrusion 84*a* suitably comes into contact with the inner periphery surface of the pulling-portion insertion portion 109. Thus, the positioning is done on the ink introduction needle 80, and the position thereof is set to be the central position of the ink pulling portion 91.

Then, as illustrated in FIG. 3, the cap 87 is screwed into the pulling-portion insertion portion 109, and then the lid 21 is closed, thereby completing an operation of setting up each ink accommodating body 17 in the case 18. When each ink accommodating body 17 is set up in the case 18, the ink in the ink accommodating body 17 is supplied from each connection tube 37 through each ink supply needle 35 and each ink supply tube 36 to the recording head 28. Each ink supplied to the recording head 28 is ejected from each nozzle (an illustration thereof is omitted) of the recording head 28 onto a sheet of paper P and thus the printing is performed.

Then, when the ink of each ink accommodating body 17 is consumed due to the printing of the sheet of paper P, as the ink is consumed, the ink bag 90 of each ink accommodating body 17 is gradually shriveled. At this time, because the left sidewall formation member 52 is transparent that makes up the main receptacle body 20 of the case 18, even though the lid 21 is closed, a shriveled state (a displacement state) of the ink bag 90 of each ink accommodating body 17 within the case 18 can be visually recognized from the outside of the case 18 through the left sidewall formation member 52.

In this case, particularly, the left sidewall formation member 52 occupies not only most of the left lateral surface of the main receptacle body 20, but also most of the left half of the front surface and most of the left half of the rear surface of the main receptacle body 20. In addition, the ink accommodating bodies 17 are arranged side by side with one another in the forward and backward direction in such a manner that the ink accommodating bodies 17 are in parallel with one another in a state where each ink accommodating body 17 is inclined in such a manner that the left side is positioned closer to the front than the right side within the case 18.

Therefore, the shriveled state of the ink bag 90 of all the ink accommodating bodies 17 within the case 18 from the outside of the case 18 can be visually recognized from the front of the case 18. Because of this, the replacement time for each ink accommodating body can be recognized from the shriveled state of the ink bag 90 of each ink accommodating body 17.

Furthermore, the lower end of the ink pulling tube 99 within the ink bag 90 of the ink accommodating body 17 extends up to the lower portion of the ink bag 90 in the gravity direction within the ink bag 90. Because of this, the ink within the ink bag 90 is drawn up from the lower end portion of the ink bag 90 through the ink pulling tube 99 and then is consumed.

In this case, since the ink pulling tube 99 is configured from a material that is greater in specific gravity than the ink within the ink bag 90, the floating of the ink pulling tube 99 does not occur within the ink bag 90. Because of this, since the position of the lower end of the ink pulling tube 99 is maintained in the lower portion of the ink bag 90 in the gravity direction within the ink bag 90, the ink remaining within the ink bag 90 after use can be reduced.

Furthermore, an operation in a case of replacing the ink accommodating body 17 within which the ink is not present is performed after the ink circulation adjusting member 82 (refer to FIG. 13) that is attached to the connection tube 37 corresponding to the replacement-desired ink accommodating body 17 is set to the mode in which the corresponding connection tube 37 is squeezed and thus the circulation of the ink is within the corresponding connection tube 37 is regulated. By doing this, the suspending and falling of the ink from the introduction hole 80*a* in the ink introduction needle 80 is suppressed when the cap 87 is removed from the pulling-portion insertion portion 109 of the ink accommodating body 17 and thus the ink introduction needle 80 is pulled out of the ink pulling portion 91.

Next, an operation in a case where the original copy G larger in size than the reading surface 13*a* is read by the reading apparatus 13 of the image forming system 11 is described.

Then, as illustrated in FIG. 2, in the case where the original copy G larger in size than the reading surface 13*a* is read by the reading apparatus 13, first, the auto document feeder 16 is opened and thus the reading surface 13*a* is exposed. Subsequently, the original copy G is placed in such a manner that a reading-desired region of the original copy G is held in place on the reading surface 13*a* and that one portion of the part, which protrudes from over the reading surface 13*a*, of the corresponding original copy G is positioned on the case 18 (on the lid 21).

At this time, the case 18 is matched with the reading surface 13*a* in terms of height. That is, the height of the case 18 is smaller only by 5 mm than that of the reading surface 13*a*. Because of this, one portion of the original copy G is supported on the case 18, without being get stuck in the lateral side of the case 18. Then, when the reading apparatus 13 is operated in a state where the auto document feeder 16 is closed, the region of the original copy G, which is held in place on the reading surface 13*a*, is read.

In this manner, because one portion of the original copy G, which protrudes from the reading surface 13*a* is supported by the case 18, the position of the original copy G is stabilized, and the original copy G can be accurately read by the reading apparatus 13.

According to the embodiments described above, the following effects can be obtained.

(1) In the ink supply apparatus 15, the ink accommodating body 17 is detachably and attachably supported with respect to the right concavity portion 56 and the left concavity portion 59 in the case 18, in such a manner that the ink pulling portion 91 is positioned higher in the gravity direction than the ink bag 90. Because of this, the ink pulling portion 91 and the ink introduction needle 80 can be reliably connected to each other while they are visually checked. Furthermore, normally, because the ink gathers by its own weight in the lower portion of the bag 90, if the ink pulling portion 91 is present in the lower portion of the ink bag 90, there is a concern that an amount of ink leakage will be increased when a defective connection occurs between the ink pulling portion 91 and the ink introduction needle 80. In this respect, since with this configuration, the ink pulling portion 91 is positioned higher in the gravity direction than the ink bag 90, even though the defective connection is present between the ink pulling portion 91 and the ink introduction needle 80, the amount of ink leakage can be suppressed.

(2) The ink bag 90 is a bag body that is configured from the two opposing flexible films 90*a*, and is formed in such a manner that as the ink accommodated within the ink bag 90 is consumed, the two flexible films 90*a* become closer to each other. Because of this, the displacement state of the flexible film 90*a* due to the consumption of the ink within the ink bag 90 is visually recognized and thus the consumption state of the ink within the ink bag 90 can be easily recognized.

(3) The case 18 has the bottom wall 49, the opening portion 19 that faces the bottom wall 49 and is formed more upward in the gravity direction than the bottom wall 49, and the lid 21 that covers the opening portion 19 in such a manner as to open and close the opening portion 19 freely. The ink accommodating body 17 is accommodated within the case 18 through the opening portion 19 in such a manner that the ink accommodating body can be attached and detached. With this configuration, since the ink accommodating body 17 is attached to and detached from the case 18 through the opening portion 19 that is formed over the case 18 in the gravity direction, an operation of attaching and detaching the ink accommodating body 17 to and from the case 18 can be easily performed. In addition, because the ink accommodating body 17 is accommodated within the case 18 and then the opening portion 19 is covered with the lid 21, damage to the ink accommodating body 17 or the connection tube 37 and slippage between the ink pulling portion 91 and the ink introduction needle 80 due to an erroneous connection therebetween can be suppressed. Because of this, defects in ink supply or contamination due to the ink can be suppressed. Furthermore, because operations of connecting and disconnecting the ink pulling portion 91 and the ink introduction needle 80 are performed on the case 18 that has the bottom wall 49, even though the ink is suspended, the ink suspended can be caught within the case 18. Because of this, contamination of the outside of the case 18 can be suppressed.

(4) The case 18 has the transparent left sidewall formation member 52 through which the shriveled state of the ink bag 90 due to the consumption of the ink within the ink accommodating body 17 can be visually recognized. Because of this, the shriveled state of the ink bag 90 of the ink accommodating body 17 within the case 18 can be visually recognized from the outside of the case 18. That is, the consumption state of the ink within the ink accommodating body 17 within the case 18 can be visually recognized from the outside of the case 18.

(5) A distance between the right sidewall 45 and the left sidewall 46 of the case 18 is smaller than the width of the ink accommodating body 17. Because of this, the accommodation of each ink accommodating body 17 within the case 18 in an inclined manner contributes to the miniaturization of the case 18.

(6) The ink pulling portion 91 of the ink accommodating body 17 is formed on the upper end of the ink bag 90. The ink accommodating body 17 includes the support member 92, engaged with the corresponding upper end, on the upper end on which the ink pulling portion 91 is formed, and is supported by the right concavity portion 56 and the left concavity portion 59 in the case 18 through the support member 92. With this configuration, because the upper end on which the ink pulling portion 91 is formed is supported by the right concavity portion 56 and the left concavity portion 59 in the case 18, a connection between and the ink pulling portion 91 and the ink introduction needle 80 can be easily performed in the ink accommodating body 17. Furthermore, because the ink accommodating body 17 includes the support member 92 and thus the ink accommodating body 17 can be handled with the support member 92 being held in a firm grip, the attaching and detaching operation on the right concavity portion 56 and the left concavity portion 59 in the case 18 of the ink accommodating body 17 can be performed.

(7) The upper end on which the ink pulling portion 91 is formed is supported by the right concavity portion 56 and the left concavity portion 59 in the case 18, and thus the ink accommodating body 17 is suspended. With this configuration, because the ink accommodating body 17 is suspended and thus the ink gathers by its own weight in the lower portion of the accommodating body 17, tension is applied to the ink bag 90. For this reason, the ink can be stably supplied to the ink jet printer 12 because the ink bag 90 extends neatly in a state where wrinkle and distortion of the ink bag 90 due to the consumption of the ink within the ink bag 90 are not present. Furthermore, according to the present embodiment, because the ink jet printer 12 is a type of printer in which the carriage 27 equipped with the recording head 28 moves, vibration of the ink jet printer 12 propagates to the ink accommodating body 17 and thus the lower portion of the ink accommodating body 17 shakes. Furthermore, because the support member 92 facing the upper end of the ink accommodating body 17 is arranged in the direction that intersects the moving direction (a main scanning direction) of the carriage 27 when viewed from above, the movement of the carriage 27 makes it easier for the vibration to propagate to the ink accommodating body 17 than when the support member 92 is arranged in the direction parallel with the main scanning direction. Because of this, in a case where the ink within the ink bag 90 is a pigment ink that includes pigment that precipitates easily in ink, the pigment ink can be agitated by the shaking of the lower portion of the ink accommodating body 17. Therefore, differences in the concentration of pigment in the pigment ink can be suppressed.

(8) The support member 92 of the ink accommodating body 17 supports the ink pulling portion 91 in the ink accommodating body 17. For this reason, the ink can be stably supplied to the ink jet printer 12 because the ink bag 90 extends neatly in a state where wrinkle and distortion of the ink bag 90 due to the consumption of the ink within the ink bag 90 of the ink accommodating body 17 are not present.

(9) The support member 92 of the ink accommodating body 17 supports the ink bag 90 with both sides thereof that interpose the ink pulling portion 91 therebetween. Because of this, the ink bag 90 can be stably supported by the support member 92 with the balance being well established.

(10) The ink accommodating body 17 has the passage 99*a* that communicates with the ink pulling portion 91 and extends the lower portion, in the gravity direction, of the ink bag 90. With this configuration, even though the ink pulling portion 91 is positioned over the ink bag 90, because the ink can be sucked up from the lower portion within the ink bag 90 through the passage 99*a*, the ink within the ink bag 90 can be stably supplied to the ink jet printer 12.

(11) The ink pulling tube 99 of the ink accommodating body 17 is configured from a material that is higher in specific gravity than the ink accommodated in the ink bag 90. Because of this, the floating of the ink pulling tube 99 in the ink within the ink bag 90 can be suppressed. Therefore, because the ink positioned in the lower end opposite to the ink pulling portion 91 within the ink bag 90 is guided smoothly to the ink pulling portion 91 by the ink pulling tube 99, the ink staying behind within the ink bag 90 can be reduced.

(12) The ink pulling portion 91 of the ink accommodating body 17 has the communication hole 100 communicating with the inside of the ink bag 90 in the part thereof that extends into the ink bag 90. With this configuration, when the ink is ejected, from the ink pulling portion 91 positioned vertically over the ink bag 90, into the ink bag 90, bubbles mixed with the ink within the ink bag 90 can be discharged from the communication hole 100 in the ink pulling portion 91 to the outside of the ink accommodating body 17.

(13) The inclination portion 101, which is inclined in such a manner as to ascend toward the communication hole 100, is formed to the side of the ink pulling portion 91 within the ink bag 90 of the ink accommodating body 17. Because of this, when the ink is ejected, from the ink pulling portion 91 positioned vertically over the ink bag 90, into the ink bag 90, the bubbles mixed with the ink within the ink bag 90 can be guided to the communication hole 100 by the inclination portion 101. As a result, the bubbles mixed with the ink within the ink bag 90 can be smoothly discharged from the communication hole 100 to the outside of the ink accommodating body 17.

(14) The ink pulling tube 99 of the ink accommodating body 17 is connected to the ink pulling portion 91 through the flexible connection passage member 98. Because of this, the ink pulling tube 99 can be easily connected to the ink pulling portion 91 by the connection passage member 98.

(15) The first to fourth tube support portions 65 and 73 to 75, which guide each connection tube 37 that is connected to each ink accommodating body 17 that is accommodated within the main receptacle body 20, are provided on the internal surface of the main receptacle body 20 of the case 18. For this reason, the connection tube 37 can be easily pulled into place within the main receptacle body 20 because each connection tube 37 can be guided within the main receptacle body 20 by the first to fourth support portions 65, and 73 to 75.

(16) The receptacle-side insertion through-hole 61, into which each connection tube 37 can be inserted, is formed in the internal surface of the right sidewall formation member 51 of the main receptacle body 20 of the case 18. The first to fourth support portions 65, and 73 to 75 guide the connection tubes 37, respectively, between the receptacle-side insertion hole 61 and the ink accommodating bodies 17 accommodated within the main receptacle body 20. Because of this, the connection tubes 37, which are inserted from the receptacle-side insertion through-hole 61 into the main receptacle body 20, can be guided by the first to fourth tube support portions 65 and 73 to 75 to the ink accommodation bodies 17, respectively, that are accommodated within the main receptacle body 20.

(17) The lengths of the first to fourth tube support portions 65, and 73 to 75 in the case 18 differ from one another according to the distances, from the ink accommodating bodies 17 to which the connection tubes 37 guided by the first to fourth tube support portions 65, and 73 to 75 are connected, respectively, to the receptacle-side insertion through-hole 61. Because of this, the connection of the connection tube 37 to the wrong ink accommodating body 17 can be suppressed.

(18) The main receptacle body 20 of the case 18 includes the edge member 53 that makes up the periphery portion of the opening portion 19 for accommodating each ink accommodating body 17. The edge member 53 covers the first to fourth support portions 65 and 73 and 75. Because of this, the connection tubes 37 guided by the first to fourth tube support portions 65 and 73 to 75, respectively, can be protected by the edge member 53.

(19) The notch portion 57 into which each connection tube 37 can be inserted is provided in the edge member 53 of the case 18. Because of this, each connection tube 37 is inserted through the notch portion 57, and thus each connection tube 37 can be easily connected to each ink accommodating body 17.

(20) The edge member 53 of the case 18 includes the right concavity portions 56 and the left concavity portions 59. Each right concavity portion 56 and each left concavity portion 59 support each ink accommodating body 17. Because of this, each ink accommodating body 17 can be supported by each right concavity portion 56 and each left concavity portion 59.

(21) Each protrusion 76 for suppressing the falling-off of each connection tube 37 from the third and fourth tube support portions 74 and 75 is provided in the corresponding third and fourth tube support portions 74 and 75 of the case 18. Because of this, the falling-off of each connection tube 37 from the third and fourth tube support portions 74 and 75 can be suppressed by each protrusion 76.

(22) The through holes 77 are formed in both sides, respectively, of the internal surface of the main receptacle body 20 of the case 18, which interpose the second to fourth tube support portions 73 and 75 therebetween. Because of this, the connection tube 37 can be reliably retained within each of the second to fourth tube support portions 73 to 75 easily and reliably by making the wiring pass through the through hole 77 and connecting the end portions of the corresponding wiring in the shape of a ring.

(23) The sidewall of the main receptacle body 20 of the case 18 is configured from a combination of the right sidewall formation member 51 and the left sidewall formation member 52 that result from the division into left and right parts. Because of this, the sidewall of the main receptacle body 20 of the case 18 can be easily formed.

(24) The ink supply apparatus 15 includes the case 18, the ink accommodating body 17 that is accommodated within the case 18, and each connection tube 37 that is connected to each ink accommodating body 17. Because of this, the ink within each ink accommodating body 17 that is accommodated within the case 18 can be supplied to the ink jet printer 12 through each connection tube 37.

(25) The ink jet printer 12 includes the recording head 28 that can eject the ink supplied through each connection tube 37 of the ink supply apparatus 15 onto the sheet of paper P. Because of this, the ink supplied through each connection tube 37 of the ink supply apparatus 15 is ejected from the recording head 28 onto the sheet of paper P and thus the printing can be performed on the corresponding sheet of paper P.

(26) In the image forming system 11, the case 18 is arranged beside the image forming apparatus 14 in such a manner that the case 18 is matched with the reading surface 13*a* in terms of height. Because of this, in a case where the original copy G is read that is larger in size than the reading surface 13*a*, one portion of the corresponding original copy G can be supported by the case 18.

(27) In the image forming system 11, the case 18 is smaller in height than the reading surface 13*a*. Because of this, when the original copy G larger in size than the reading surface 13*a* is placed on the corresponding reading surface 13*a*, the corresponding original copy G getting stuck in the case 18 can be suppressed.

(28) In the image forming system 11, the case 18 is attached to the ink jet printer 12 of the image forming apparatus 14 in a freely attachable and detachable manner. Because of this, the case 18 can be freely attached and detached to and from the ink jet printer 12.

Modification Example

Moreover, the embodiments described above may be changed to different embodiments as follows.

Figure 23:
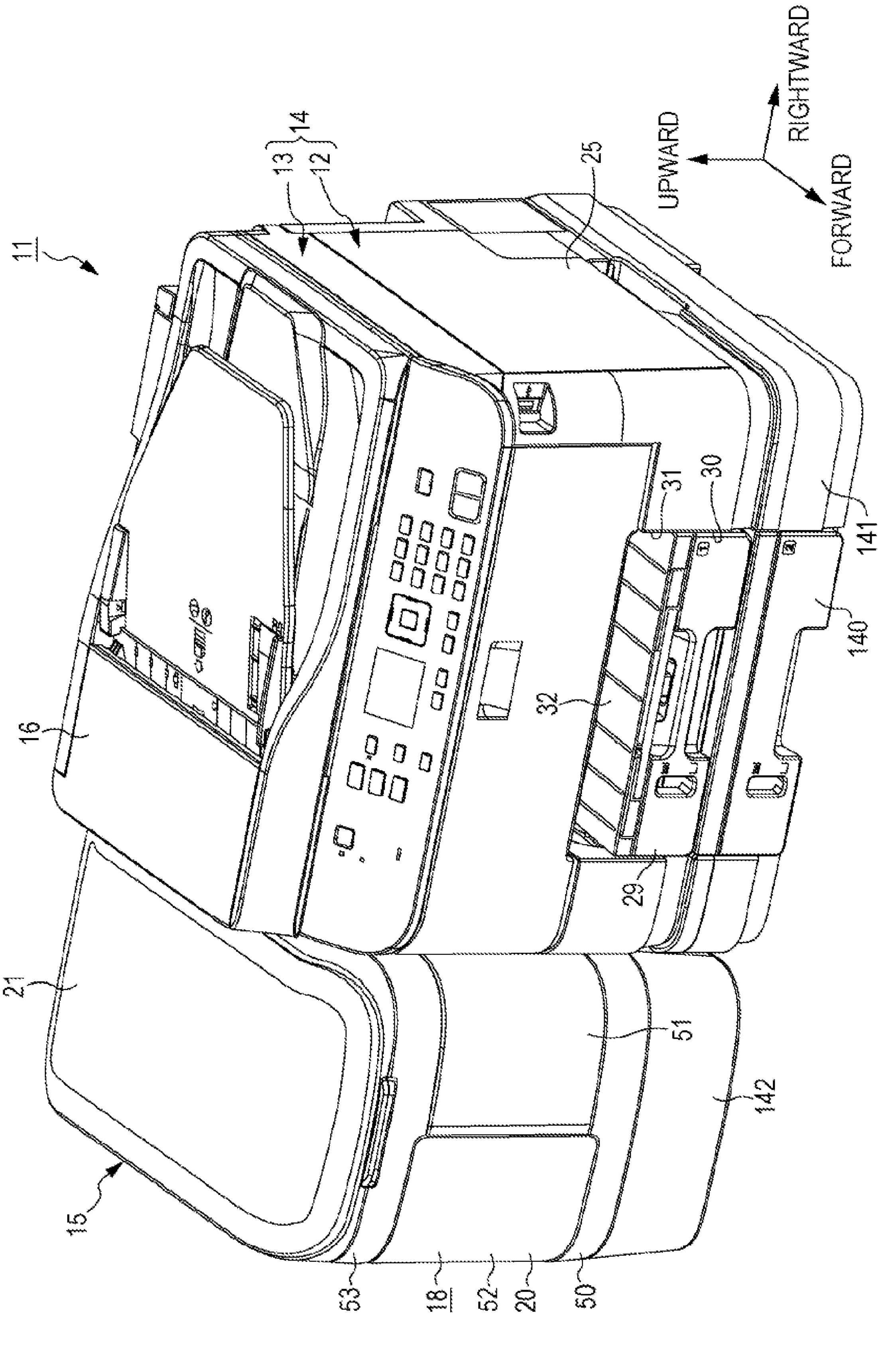
FIG. 23 is a perspective view of the image forming system in a modification example.

As illustrated in FIG. 23, in the image forming system 11, an extension cassette unit 141 that has a paper sheet cassette 140 for extension may be installed under the image forming apparatus 14. In this case, a pedestal 142 is installed under the case 18. The pedestal 142 is one example of an adjusting member that performs adjustment in such a manner that the height of the case 18 is increased as much as the height of the image forming apparatus 14 is changed in an increasing manner. In this manner, the extension cassette unit 141 and the pedestal 142 are installed, as a set, in the image forming system 11, and thus a positional relationship between the height of the case 18 and the height of the reading surface 13*a* can be maintained.

At this point, a configuration of the pedestal 142 is described in detail.

Figure 24:
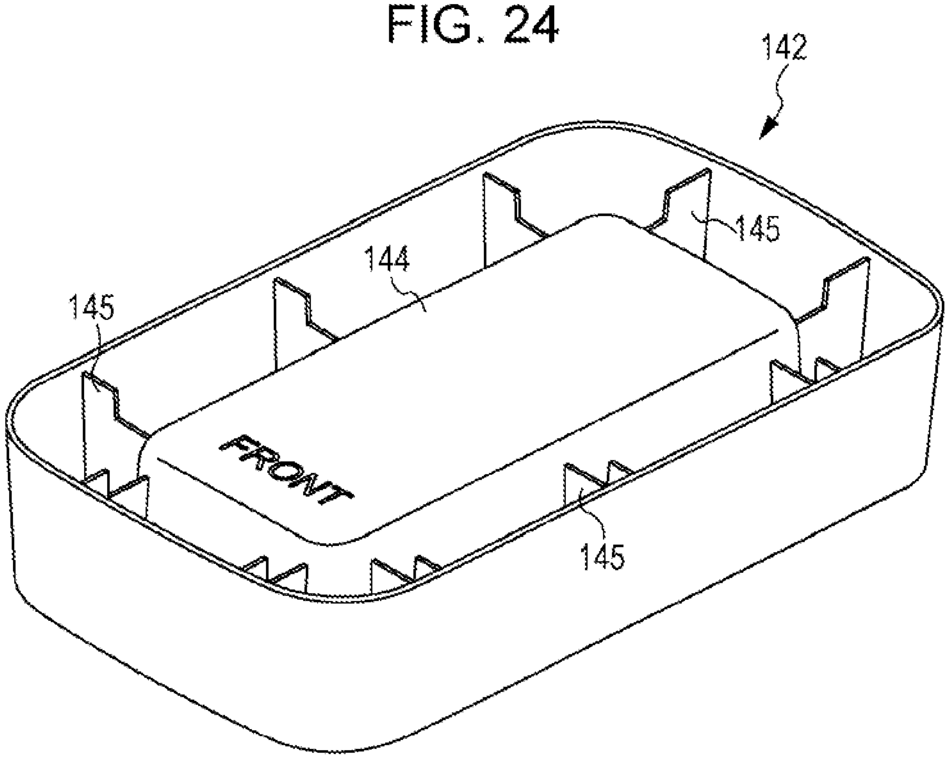
FIG. 24 is a perspective view of a pedestal of the image forming system.
Figure 25:
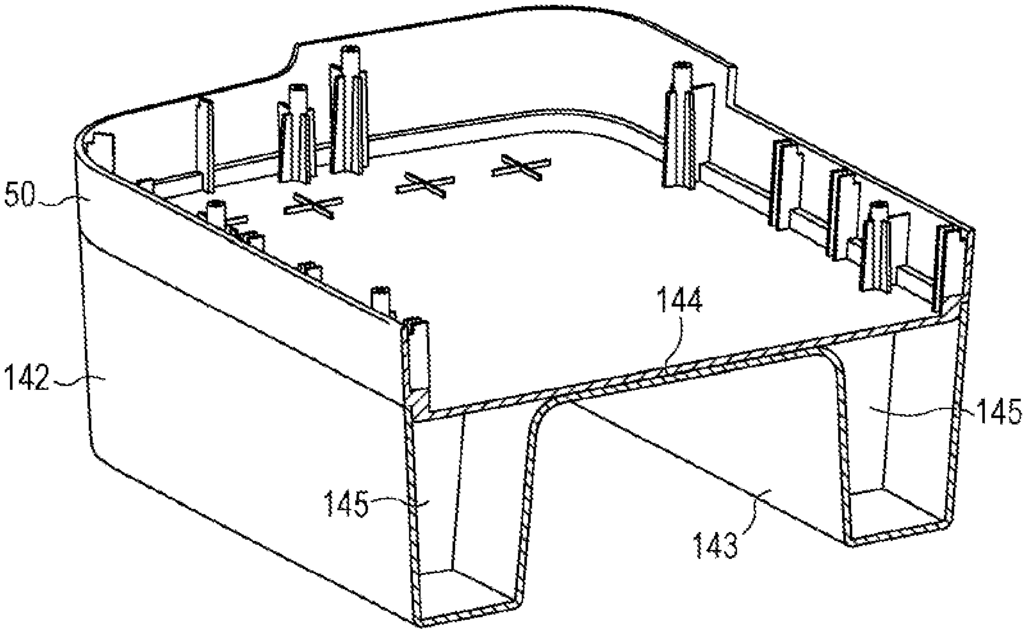
FIG. 25 is a perspective cross-sectional view illustrating a state where the pedestal is installed on the lower surface of a bottom wall formation member of the case.

As illustrated in FIG. 24 and FIG. 25, the pedestal 142 in the shape of a rectangular box having the bottom has a recess portion 143, recessed in the shape of a rectangle, in the middle portion of the lower surface thereof. An elevation portion 144, which is elevated as much as the recess portion 143 is recessed, is formed in the middle portion of the internal bottom surface of the pedestal 142. The upper surface of the elevation portion 144 is flat. Multiple (here, 10 pieces) support ribs 145, each in the shape of a plate, are provided in the vicinity of the elevation portion 144 on the internal bottom surface of the pedestal 142, in such a manner that they are appropriately spaced relative to one another and surround the elevation portion 144. Then, in a case where the pedestal 142 is installed under the case 18, the elevation portion 144 is made to adheres to the middle portion of the bottom wall formation member 50 that makes up the case 18 using a double-sided adhesive tape (an illustration thereof is omitted), and the periphery portion of the upper end of the pedestal 142 is engaged with the periphery portion of the lower surface of the bottom wall formation member 50.

Figure 26:
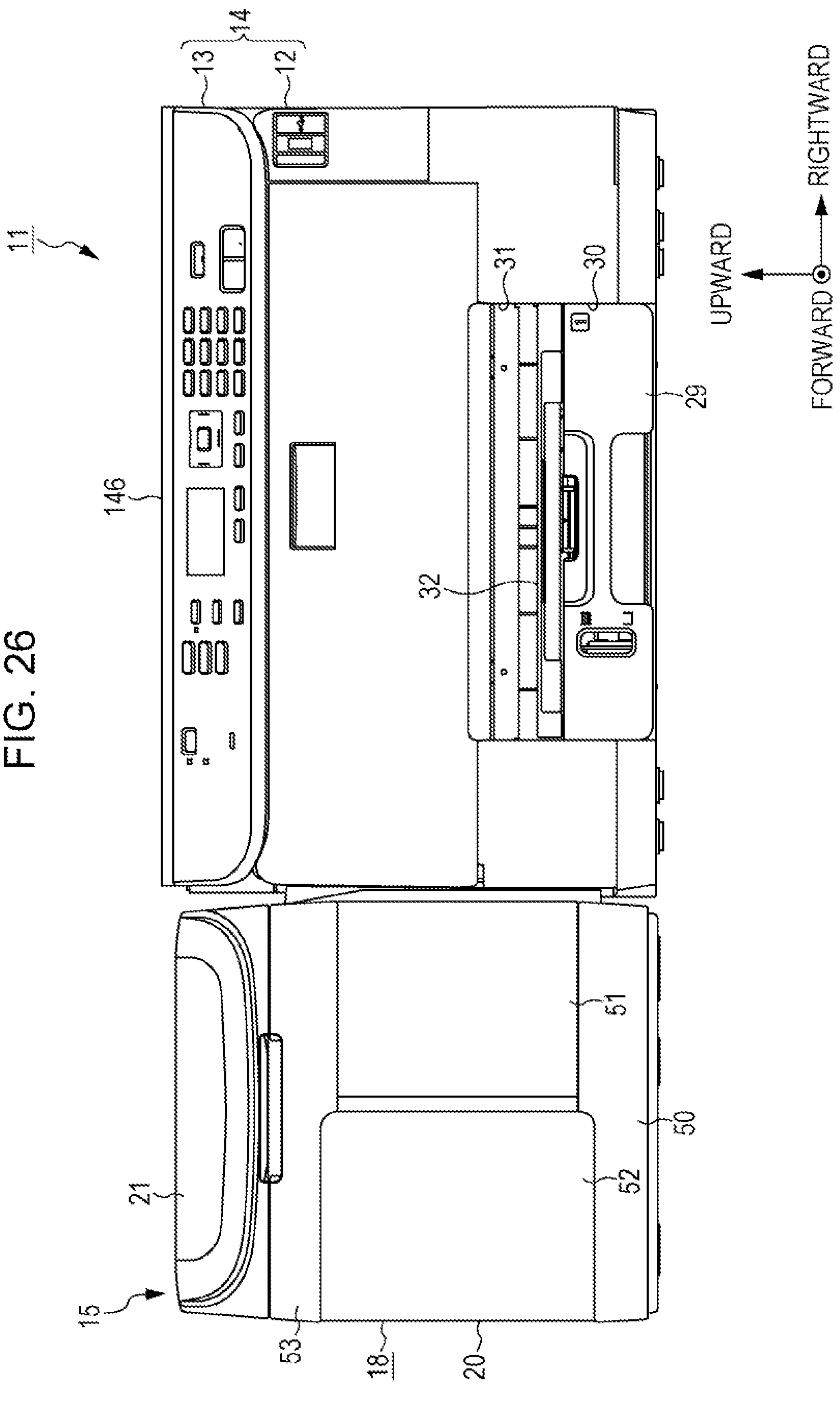
FIG. 26 is a perspective view of the image forming system in a modification example.

As illustrated in FIG. 26, in the image forming system 11, the auto document feeder 16 may be changed to a lid member 146 that can open and close the reading surface 13*a*.

Figure 27:
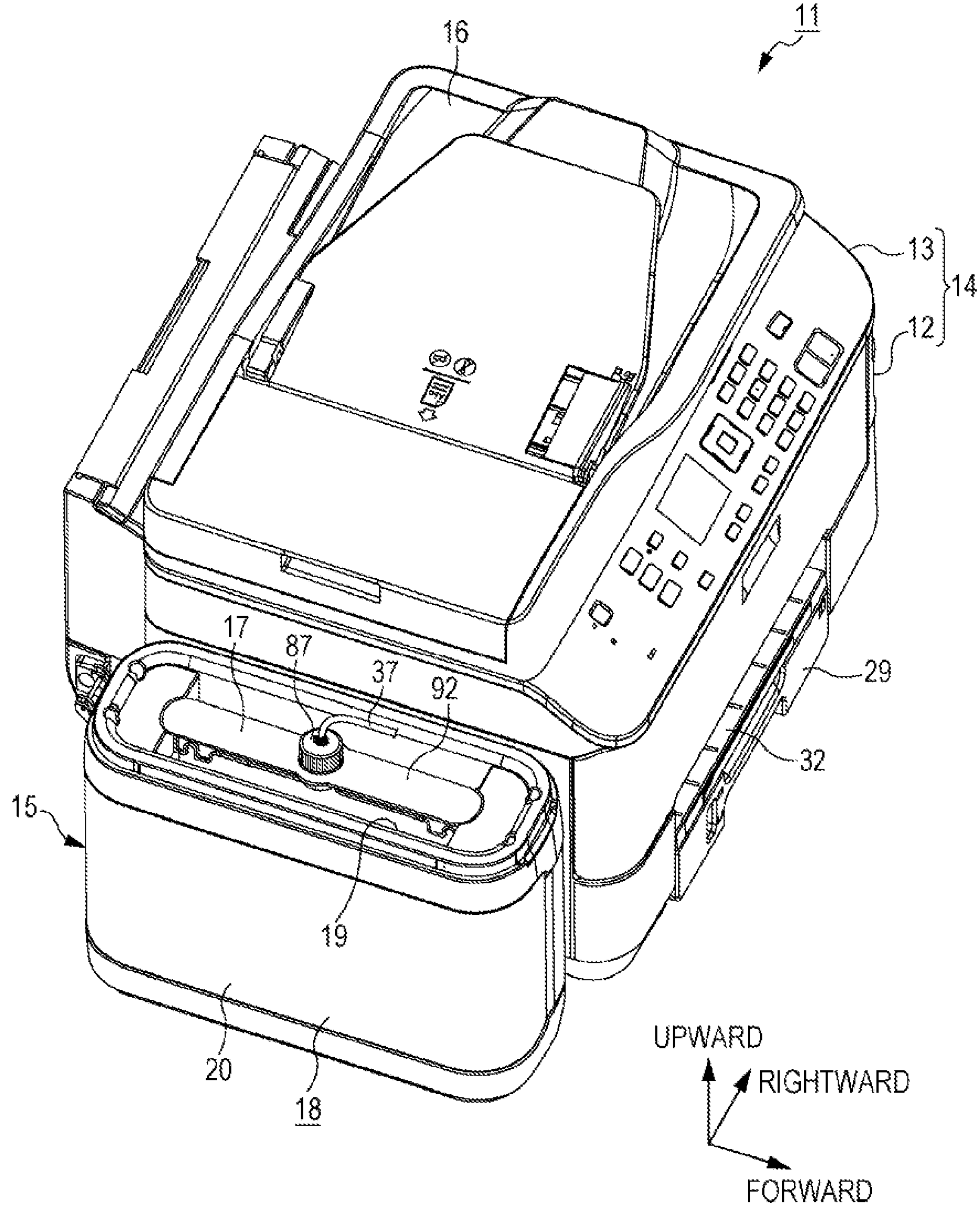
FIG. 27 is a perspective view of the image forming system in a modification example.

As illustrated in FIG. 27, in the image forming system 11, in a case where the ink jet printer 12 is a single-color printer that accommodates only black ink, the case 18 of the ink supply apparatus 15 may be changed to a case with the size that accommodates one ink accommodating body 17 that accommodates the black ink. In this case, the ink accommodating body 17 is accommodated within the case 18 in such a manner that the width of the ink accommodating body 17 becomes the forward and backward direction. Moreover, in FIG. 27, the lid 21 is omitted that covers the opening portion 19 of the case 18 in such a manner that the opening portion 19 can be freely opened and closed.

Figure 28:
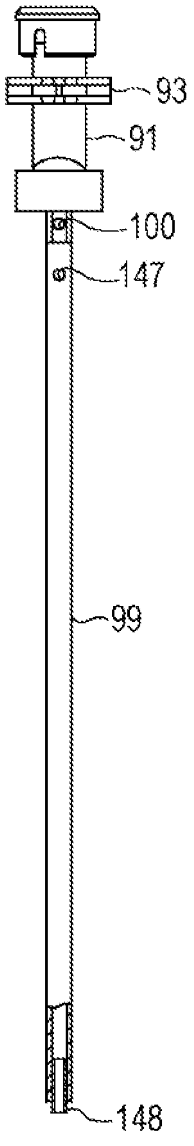
FIG. 28 is a side view of the ink pulling tube in a modification example.

As illustrated in FIG. 28, a communication hole 147, through which the inside of the corresponding ink pulling tube 99 and the inside of the ink bag 90 communicate with each other, may be provided in the upper end portion of the ink pulling tube 99. With this configuration, when the ink pulling portion 91 is arranged to be positioned vertically upward over the ink bag 90 and the ink is ejected into the ink bag 90, the bubbles mixed with the ink within the ink bag 90 can be discharged from the communication hole 147 to the outside of the ink accommodating body 17. In this case, the communication hole 100 in the ink pulling portion 91 may be omitted.

As illustrated in FIG. 28, a spindle 148 may be arranged in the lower end portion, the end portion of the ink pulling tube 99, which is opposite to the ink pulling portion 91. The spindle 148 takes the shape of a cylinder and is inserted into the lower end of the ink pulling tube 99. In this case, the ink pulling tube 99 is not necessarily required to be configured from a material that is higher in specific gravity than the ink with which the ink bag 90 is filled. When this is done, the floating of the ink pulling tube 99 in the ink within the ink bag 90 can be effectively suppressed. For this reason, because the ink positioned in the lower end opposite to the ink pulling portion 91 within the ink bag 90 is guided to the ink pulling portion 91 by the ink pulling tube 99, the ink remaining within the ink bag 90 can be reduced. Furthermore, in a case where the tube in the shape of a cylinder, as the spindle, the corresponding tube may be configured from a pliable material, such as an elastomer, in the same manner as the connection passage member 98. In this case, even though the ink pulling tube 99 is made from a comparatively-hard material, there is an effect in which damage to the ink bag 90 can be prevented.

Figure 29:
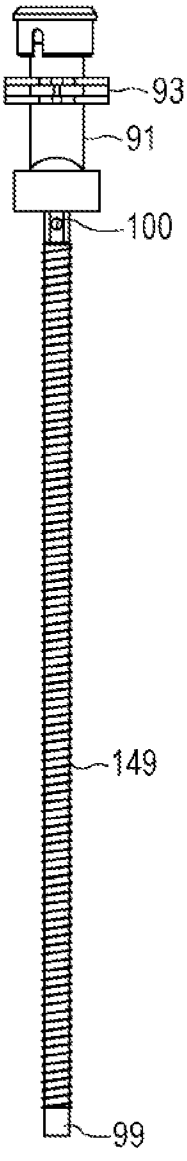
FIG. 29 is a side view illustrating a state in which the ink pulling tube in the modification example is covered by a cover member.

As illustrated in FIG. 29, the ink pulling tube 99 may be covered by a cover member 149. In this case, as one example, the cover member 149 is configured from a coil spring. When this is done, the floating of the ink pulling tube 99 in the ink within the ink bag 90 can be suppressed due to the weight of the cover member 149. In this case, an average specific gravity of a material that makes up the ink pulling tube 99 and a material that makes up the cover member 149 may be higher than the specific gravity of the ink with which the ink bag 90 is filled. Furthermore, in this case, if the spindle 148 is attached to the lower end portion of the ink pulling tube 99, the ink pulling tube 99 is not necessarily required to be configured from a material that is higher in specific gravity than the ink with which the ink bag 90 is filled.

Figure 30:
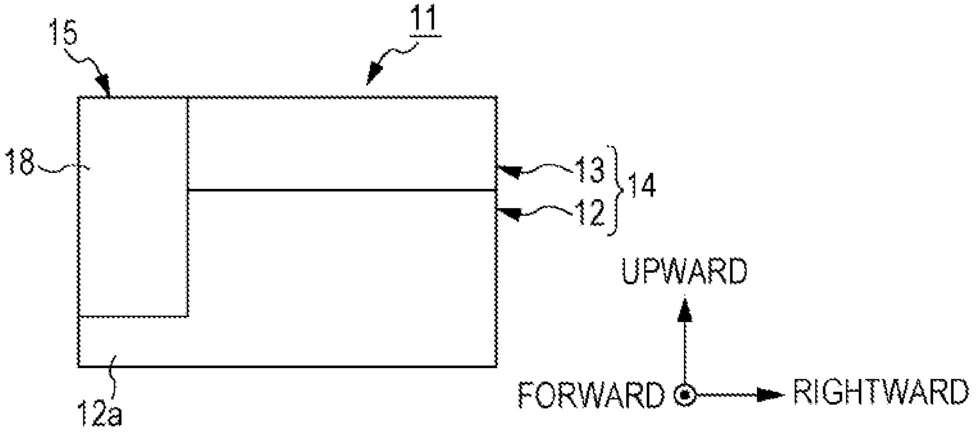
FIG. 30 is a schematic front view of the image forming system in the modification example.

As illustrated in FIG. 30, in the image forming system 11, the case 18 may be arranged beside the reading apparatus 13 in such a manner that the upper surfaces of the case 18 is matched with the reading surface 13*a* in terms of height. In this case, an extension portion 12*a* that can support the case 18 may be protrusively provided on the lateral surface of the ink jet printer 12, and thus the case 18 may be supported by the corresponding extension portion 12*a*.

In ink accommodating body 17, the ink pulling tube 99 that makes up the passage 99*a* may be omitted.

The support member 92 of the ink accommodating body 17 is not necessarily required to support the ink bag 90 with both sides thereof that interpose the ink pulling portion 91 therebetween.

The support member 92 of the ink accommodating body 17 is not necessarily required to support the ink pulling portion 91 in the ink accommodating body 17.

The upper end on which the ink pulling portion 91 is formed is supported by the right concavity portion 56 and the left concavity portion 59 in the case 18, and thus the ink accommodating body 17 is not necessarily required to be suspended. That is, the ink accommodating body 17 may be accommodated in a state where it is placed on the internal bottom surface of the case 18. In this case, the internal bottom surface (the bottom wall 49) of the case 18 functions as a support portion that supports the ink accommodating body 17.

Instead of the support member 92 as the liquid accommodating body support portion, a hard support portion in the shape that can be supported by the right concavity portion 56 and the left concavity portion 59 in the case 18 may be provided on the upper end portion (one end to the side of the ink pulling portion 91) of the ink bag 90 of the ink accommodating body 17. When this is done, the ink accommodating body 17 can be handled with the support member being held in a firm grip. The attaching and detaching operation on the right concavity portion 56 and the left concavity portion 59 in the case 18 of the ink accommodating body 17 can be easily performed.

The ink accommodating body 17 is not necessarily required to be supported by the right concavity portion 56 and the left concavity portion 59 in the case 18 through the support member 92.

The distance between the right sidewall 45 and the left sidewall 46 of the case 18 is not necessarily required to be smaller than the width of the ink accommodating body 17.

The case 18 is not necessarily required to have the transparent left sidewall formation member 52 through which the shriveled state of the ink bag 90 due to the consumption of the ink within the ink accommodating body 17 can be visually recognized.

The opening portion 19 of the case 18 is not necessarily required to be provided on the upper end of the main receptacle body 20 and may be provided on the lateral surface of the main receptacle body 20.

The lid 21 of the case 18 may be omitted.

All the ink bags 90 are not necessarily required to be configured from the flexible film 90*a*. That is, some of the ink bags 90 may be configured from the flexible portion that is made from a flexible material. Furthermore, a material that makes up the flexible portion of the ink bag 90 may be transparent or may be opaque.

The ink accommodating body 17 is not necessarily required to be detachably and attachably supported by the right concavity portion 56 and the left concavity portion 59 in the case 18, in such a manner that the ink pulling portion 91 is positioned higher in the gravity direction than the ink bag 90.

The ink introduction needle 80 may be omitted, and the end portion of the connection tube 37 may be configured in such a manner that it is connected directly to the ink pulling portion 91. In this case, the end portion of the ink pulling portion 91 that is connected to the connection tube 37 functions as the liquid introduction portion.

The ink pulling tube 99 of the ink accommodating body 17 is not necessarily required to be connected to the ink pulling portion 91 through the flexible connection passage member 98. That is, the ink pulling tube 99 may be connected to the ink pulling portion 91 using a bonding agent, an adhesive tape, or the like.

Instead of the inclination portion 101, a curvature portion in the shape of a curve as the guide portion may be formed within the ink bag 90 of the ink accommodating body 17, in such a manner as to ascend toward the communication hole 100.

The communication hole 100 in the ink pulling portion 91 of the ink accommodating body 17 may be omitted.

The ink pulling tube 99 of the ink accommodating body 17 is not necessarily required to be configured from a material that is higher in specific gravity than the ink accommodated in the ink bag 90.

Only one portion, in the direction of the lower end, of the ink pulling tube 99 of the ink accommodating body 17, which is opposite to the ink pulling portion 91, may be configured from a material that is higher in specific gravity than the ink accommodated in the ink bag 90.

The sidewall of the main receptacle body 20 of the case 18 is not necessarily required to be configured from a combination of the right sidewall formation member 51 and the left sidewall formation member 52 that result from the division into left and right parts. That is, the sidewall of the main receptacle body 20 may be configured from a combination of three or more members that result from the division into three parts and may be configured from one member that does not result from the division.

The through hole 77 formed in the main receptacle body 20 in the case 18 may be omitted.

Each protrusion 76 formed on the third and fourth tube support portions 74 and 75 in the case 18 may be omitted.

The notch portion 57 provided on the edge member 53 of the case 18 may be omitted.

Instead of the notch portion 57, a hole through which the connection tube 37 can be inserted may be provided in the edge member 53 of the case 18 as the insertion through-portion.

The edge member 53 of the case 18 is not necessarily required to cover the first to fourth tube support portions 65 and 73 to 75.

The lengths of the first to fourth tube support portions 65, and 73 to 75 in the case 18 is not necessarily required to differ from one another according to the distances, from the ink accommodating bodies 17 to which the connection tubes 37 guided by the first to fourth tube support portions 65, and 73 to 75 are connected, respectively, to the receptacle-side insertion through hole 61.

The first to fourth tube support portions 65, and 73 to 75 of the case 18 are not necessarily required to guide the connection tubes 37, respectively, between the receptacle-side insertion through hole 61 and the ink accommodating bodies 17 accommodated within the main receptacle body 20.

The first to fourth tube support portions 65, and 73 to 75 of the case 18 may be omitted.

The guide portion may be configured only from the falling-off suppression portion (each protrusion 76).

The guide portion may be configured from whatever can make the connection tube 37 access the ink accommodating body 17 along the internal surface of the main receptacle body 20. For example, the guide portion may be configured from a concavity groove provided in the internal surface of the main receptacle body 20.

The right sidewall formation member 51 and the left sidewall formation member 52 that make up the main receptacle body 20 may be in the shape of a letter L.

Each protrusion 76 may be formed on all the ribs 66 and 69 and may be formed on some of the ribs 66 and 69.

If the width of each protrusion 76 is to such an extent that the connection tube 37 is in contact, the size or shape of each protrusion 76 may be arbitrarily changed.

The color of each cap 87 and the color of the ink that accommodated in each ink accommodating body 17 that corresponds to each cap 87 may be matched to each other. When this is done, the connection of the cap 87 to the wrong ink accommodating body 17 can be suppressed.

In the image forming system 11, the case 18 is not necessarily required to be attached to the ink jet printer 12 of the image forming apparatus 14 in a freely attachable and detachable manner. That is, the case 18 may be fixed to the ink jet printer 12 of the image forming apparatus 14.

In the image forming system 11, the matching the heights of the case 18 with the reading surface 13*a* in terms of height may include a tolerance of approximately ±20 mm.

In the image forming system 11, the height of the case 18 is not necessarily required to be smaller than that of the reading surface 13*a*. That is, the height of the case 18 is the same as that of the reading surface 13*a*, but may be increased to be larger than that of the reading surface 13*a*.

Instead of the sheet of paper P, a plastic film, cloth, metal foil, or the like may be used as a target onto which the ink is ejected.

Instead of the original copy G, a plastic film, cloth, metal foil, or the like may be used as a medium.

According to the embodiments described above, the liquid ejecting apparatus may be a liquid ejecting apparatus that ejects or discharges liquid other than ink. Moreover, a state of liquid that is discharged as a minute droplet of liquid from the liquid ejecting apparatus, is defined as including a granular shape, a tear shape, and a thread shape with a tail. Furthermore, the liquid here may be whatever material can be ejected from the liquid ejecting apparatus. For example, a substance in a liquid phase state may be possible. The substance is defined as including a liquid substance with high or low in viscosity, sol, gel water, other inorganic solvents, an organic solvent, a solution, liquid resin, and a fluidal substance such as liquid metal (metallic melt). Furthermore, the substances are defined as including not only liquid as one phase of the substance but also substances that result from particles of a functional material made from solids such as pigments and metal particles being dissolved, distributed, or mixed in a solvent. As a representative example of the liquid, the ink described above according to the embodiment or liquid dispensed onto a print medium before or after printing with the ink, liquid for humidifying or cleaning a liquid ejecting nozzle of the liquid ejecting apparatus, liquid crystal, and the like are enumerated. At this point, the ink is defined as including general water-based ink and solvent ink, and various liquid compositions such as gel ink and hot melt ink. As a specific example of the liquid ejecting apparatus, for example, there is a liquid ejecting apparatus that ejects liquid which includes materials in a distributed or dissolved state, such as an electrode material or a coloring material used, for example, in manufacturing a liquid crystal display, an EL (electro luminescence) display, a field emission display, and a color filter. Furthermore, there may be a liquid ejecting apparatus that ejects a living body organic material used in manufacturing a biochip, a liquid ejecting apparatus that ejects liquid that is a specimen used in a precision pipette, a textile printing apparatus, a micro dispenser and others. Moreover, there may be a liquid ejecting apparatus that ejects lubricating oil into a precision machine such as a watch and a camera using a pinpoint, and a liquid ejecting apparatus that ejects transparent resin liquid such as ultraviolet curing resin onto a substrate to form a micro hemisphere lens (an optical lens) used in an optical telecommunication element and the like. Furthermore, there may be a liquid ejecting apparatus that ejects etching liquid such as acid and alkali to etch the substrate and others.

The entire disclosure of Japanese Patent Application No. 2013-046035, filed Mar. 7, 2013 is expressly incorporated by reference herein.

What is claimed is:

1. An image forming apparatus comprising:

a liquid-accommodating-body accommodating receptacle that accommodates a liquid accommodating body that accommodates liquid, a tube through which the liquid in the liquid accommodating body can be supplied; and a liquid ejecting apparatus that is capable of ejecting the liquid supplied through the tube and a reading apparatus which has a reading surface on which that a medium that is arranged on the liquid ejecting apparatus is read, the reading apparatus being disposed above the liquid ejecting apparatus and the liquid-accommodating-body accommodating receptacle being located outside of a main body case of the liquid ejecting apparatus and the reading apparatus;

an operation panel that is operated to read an image;

wherein the operation panel is lower than the reading surface, and wherein an upper surface of the liquid-accommodating-body accommodating receptacle is arranged transversely to the reading apparatus and is height fit with the reading surface.

2. An image forming system comprising:

a liquid-accommodating-body accommodating receptacle that accommodates a liquid accommodating body that accommodates liquid;

a tube through which the liquid in the liquid accommodating body can be supplied; and an image forming apparatus that has a liquid ejecting apparatus that is capable of ejecting the liquid supplied through the tube and a reading apparatus that has a reading surface on which that a medium that is arranged on the liquid ejecting apparatus is read, the reading apparatus being disposed above the liquid ejecting apparatus, wherein the liquid-accommodating-body is located outside of a main body case of the liquid ejecting apparatus and the reading apparatus, an operation panel that is operated to read an image;

wherein the operation panel is lower than the reading surface, and wherein an upper surface of the liquid-accommodating-body accommodating receptacle is arranged transversely to the reading apparatus and is height fit with the reading surface.

3. An image forming system comprising:

a liquid-accommodating-body accommodating receptacle that accommodates a liquid accommodating body that accommodates liquid;

a tube through which the liquid in the liquid accommodating body can be supplied; and an image forming apparatus that has a liquid ejecting apparatus that is capable of ejecting the liquid supplied through the tube and a reading apparatus that has a reading surface on which that a medium that is arranged on the liquid ejecting apparatus is read, the reading apparatus being disposed above the liquid ejecting apparatus, wherein the liquid accommodating-body accommodating receptacle is located outside of the reading surface, the reading apparatus, and a main body case of the image forming apparatus, an operation panel that is operated to read an image;

wherein the operation panel is lower than the reading surface, and wherein an upper surface of the liquid-accommodating-body accommodating receptacle is transversely arranged on the same plane or lower than the reading surface of the reading apparatus.

4. The image forming system according to claim 2, wherein the liquid ejecting apparatus includes an extension portion that extends so as to support the liquid-accommodating-body accommodating receptacle.

5. The image forming system according to claim 3 further comprising:

an extension portion that extends so as to support the liquid-accommodating-body accommodating receptacle.

6. The image forming system according to claim 2, wherein an upper surface of the liquid-accommodating-body accommodating receptacle is lower in height than the reading surface.

7. The image forming system according to claim 2, wherein the liquid-accommodating-body accommodating receptacle is attached with respect to the image forming apparatus in a freely attachable and detachable manner.

8. The image forming system according to claim 3, wherein the liquid-accommodating-body accommodating receptacle is attached with respect to the image forming apparatus in a freely attachable and detachable manner.

9. The image forming system according to claim 2, further comprising:

an adjusting member that, if a height of the image forming apparatus is changed, adjusts a height of the liquid-accommodating-body accommodating receptacle in accordance with the change in the height of the image forming apparatus.

10. The image forming system according to claim 3, further comprising:

an adjusting member that, if a height of the image forming apparatus is changed, adjusts a height of the liquid-accommodating-body accommodating receptacle in accordance with the change in the height of the image forming apparatus.

11. An image forming system comprising:

a liquid-accommodating-body accommodating receptacle that accommodates a liquid accommodating body that accommodates liquid;

a tube through which the liquid in the liquid accommodating body can be supplied; and an image forming apparatus that has a liquid ejecting apparatus that is capable of ejecting the liquid supplied through the tube and a reading apparatus that has a reading surface on which that a medium that is arranged on the liquid ejecting apparatus is read, the reading apparatus being disposed above the liquid ejecting apparatus, wherein the liquid accommodating-body is located outside of a main body case of the image forming apparatus and the reading apparatus, an operation panel that is operated to read an image;

wherein the operation panel is lower than the reading surface, and wherein an upper part of the liquid-accommodating-body accommodating receptacle is arranged transversely to the reading apparatus so as to be supported with a reading medium protrudes from the reading surface to the outside.

12. An image forming system according to claim 3, wherein an upper surface of the liquid-accommodating-body accommodating receptacle is arranged 20 mm lower than the reading surface beside the reading apparatus.

13. The image forming apparatus according to claim 1, wherein the upper part of the liquid-accommodating-body accommodating receptacle that supports with a reading medium protrudes from the reading surface to the outside.

14. The image forming system according to claim 2, wherein the upper part of the liquid-accommodating-body accommodating receptacle that supports with a reading medium protrudes from the reading surface to the outside.

15. The image forming system according to claim 3, wherein the upper part of the liquid-accommodating-body accommodating receptacle that supports with a reading medium protrudes from the reading surface to the outside.

* * * * *